(12) United States Patent
Dushane et al.

(10) Patent No.: US 10,096,997 B2
(45) Date of Patent: Oct. 9, 2018

(54) SYSTEMS, DEVICES AND METHODS FOR REMOTELY CONTROLLING LOADS IN RESPONSE TO CONFIGURATION RULES AND NETWORKED ACCESSORIES

(71) Applicant: Venstar, Inc., Chatsworth, CA (US)

(72) Inventors: Steven David Dushane, Granada Hills, CA (US); Mustafa Oransel, West Hills, CA (US)

(73) Assignee: Venstar, Inc., Chatsworth, CA (US)

( * ) Notice: Subject to any disclaimer, the term of this patent is extended or adjusted under 35 U.S.C. 154(b) by 304 days.

(21) Appl. No.: 14/935,119

(22) Filed: Nov. 6, 2015

(65) Prior Publication Data

US 2016/0134113 A1    May 12, 2016

Related U.S. Application Data

(63) Continuation of application No. 14/857,783, filed on Sep. 17, 2015.

(60) Provisional application No. 62/077,176, filed on Nov. 7, 2014.

(51) Int. Cl.

| | |
|---|---|
| *G05B 15/02* | (2006.01) |
| *H02J 13/00* | (2006.01) |
| *H02J 3/14* | (2006.01) |
| *H05B 37/02* | (2006.01) |

(52) U.S. Cl.
CPC ............ *H02J 3/14* (2013.01); *H02J 13/0079* (2013.01); *H05B 37/0218* (2013.01); *H05B 37/0245* (2013.01); *H02J 2003/146* (2013.01); *Y02B 20/46* (2013.01); *Y02B 70/3225* (2013.01); *Y02B 70/3283* (2013.01); *Y04S 20/222* (2013.01); *Y04S 20/224* (2013.01); *Y04S 20/246* (2013.01)

(58) Field of Classification Search
CPC .... H02J 13/0079; H02J 2003/146; H02J 3/14; H05B 37/0218; H05B 37/0245; Y02B 20/46; Y02B 70/3225; Y02B 70/3283; Y04S 20/222; Y04S 20/224; Y04S 20/246
See application file for complete search history.

(56) References Cited

U.S. PATENT DOCUMENTS

| | | | | | |
|---|---|---|---|---|---|
| 6,118,230 | A | * | 9/2000 | Fleischmann | ...... H05B 37/0254 315/294 |
| 9,504,132 | B2 | * | 11/2016 | Aggarwal | .......... H05B 37/0245 |
| 9,787,765 | B2 | * | 10/2017 | Ciocci | ................. H04L 67/1025 |
| 9,811,102 | B2 | * | 11/2017 | Gulli' | ......................... G05F 1/66 |
| 9,872,367 | B2 | * | 1/2018 | Carrigan | ............ H05B 37/0272 |

(Continued)

*Primary Examiner* — Abdelmoniem Elamin
(74) *Attorney, Agent, or Firm* — Lauson & Tarver LLP

(57) ABSTRACT

The pending disclosure describes embodiments of systems, devices and methods of controlling lighting and appliances on a customer premises based on configuration rules. Such embodiments include responsive to the receipt of at least one configuration instruction, one or more participant zone(s) is selected from a plurality of zones that designate predefined sections of at least one customer premise based upon the received configuration instruction and a plurality of stored output control configuration rules of the plurality of zones. For the selected participant zone(s), one or more output configuration is generated and outputted based upon the selected participant zone(s), the received configuration instruction, and the stored output control configuration rules of the selected participant zone.

20 Claims, 19 Drawing Sheets

(56) References Cited

U.S. PATENT DOCUMENTS

| | | | | |
|---|---|---|---|---|
| 2014/0347173 A1* | 11/2014 | Yamaguchi | ............ | G06F 21/12 340/12.28 |
| 2014/0354187 A1* | 12/2014 | Aggarwal | .......... | H05B 37/0245 315/312 |
| 2014/0375206 A1* | 12/2014 | Holland | ................. | H02J 9/061 315/86 |
| 2015/0179058 A1* | 6/2015 | Crafts | .................... | G08C 17/02 340/12.5 |
| 2016/0033985 A1* | 2/2016 | Gulli' | ........................ | G05F 1/66 700/295 |
| 2016/0174344 A1* | 6/2016 | Potts | .................. | H05B 37/0209 315/297 |
| 2017/0150585 A1* | 5/2017 | Gajurel | ............. | H05B 37/0272 |
| 2017/0314848 A1* | 11/2017 | Ammerman | .......... | F25D 27/005 |

* cited by examiner

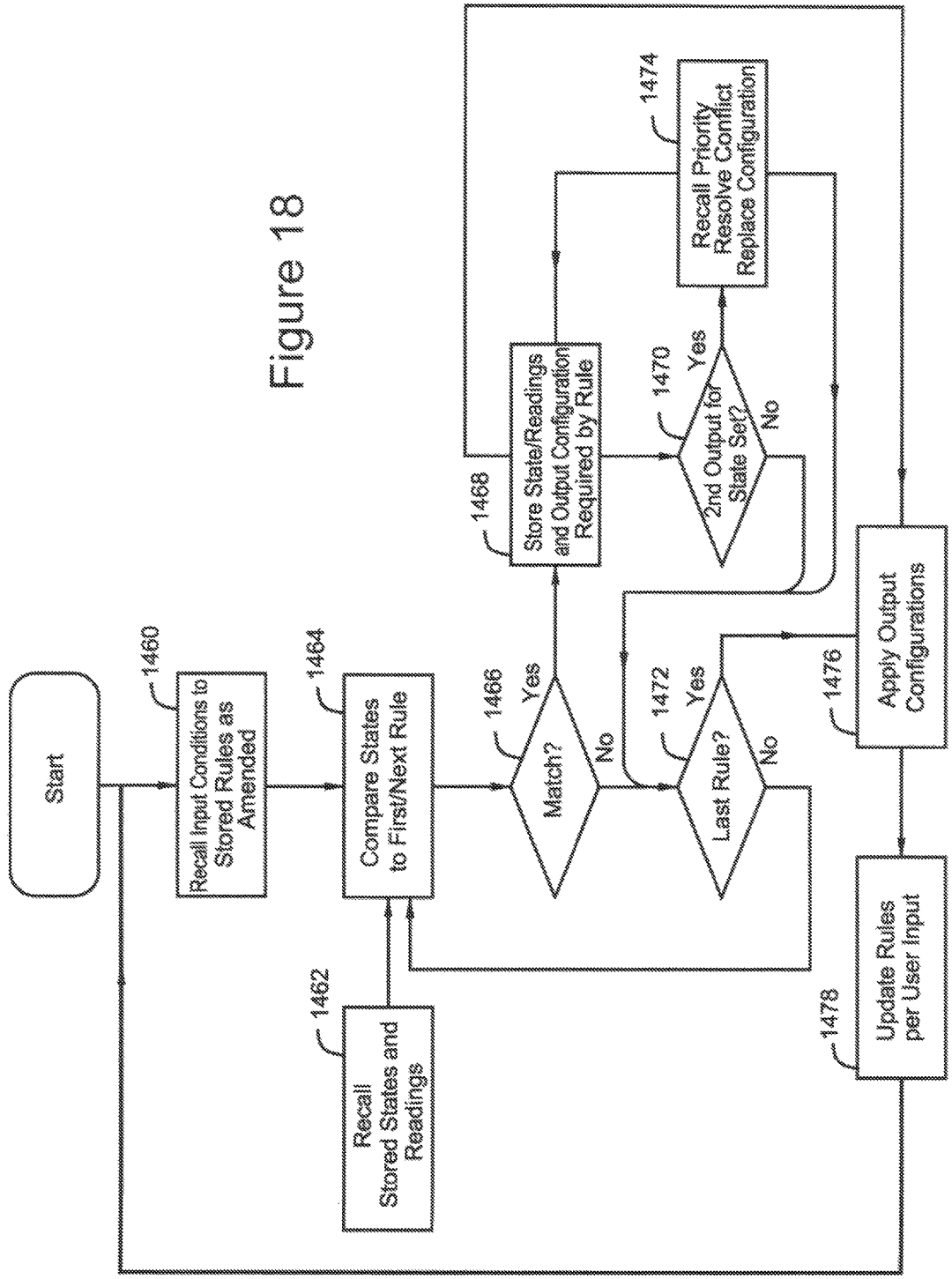

SYSTEMS, DEVICES AND METHODS FOR REMOTELY CONTROLLING LOADS IN RESPONSE TO CONFIGURATION RULES AND NETWORKED ACCESSORIES

CROSS REFERENCE TO RELATED APPLICATION

This application claims the benefit of U.S. Provisional Patent Application No. 62/077,176, entitled Systems, Devices and Methods of Controlling Lighting and Appliances on a Customer Premises Based on Configuration Rules filed Nov. 7, 2014, and U.S. patent application Ser. No. 14/857,783 entitled System, Devices and Methods of Controlling Lighting and Appliances On A Customer Premises Based On Configuration Rules filed on Sep. 17, 2015, the disclosures of which are hereby incorporated herein by reference thereto.

TECHNICAL FIELD

The invention relates to apparatus and methods for providing configuration of control of environmental and other equipment remotely.

BACKGROUND

Many companies, large and small, maintain operation of various and multiple types of equipment on their premises in connection with the conduct of their business. The cost of operating this equipment may be significant. Thus, many companies manage the cost of operating this equipment to lower company expenses, thereby increasing profit. Such equipment may include lighting of company facilities as well as controlling other electrical loads within company facilities. For example, a fast food restaurant may have indoor lights, outdoor lights, an alarm system, cooking appliances, exhaust fans and refrigeration units that are powered by electricity.

SUMMARY

However, not all such equipment may need to be operating or even available at all times. Further, there may be a need to alert company personnel of an unexpected appliance shutdown (e.g. refrigeration unit has broken down) or an unexpected startup (e.g. lighting turned on after hours).

Current systems that manage the operation of lighting and other loads may be provided to companies by third party manufacturers or distributors. Such lighting and electrical load management systems may better meet the needs of companies in managing the cost of operating lighting and other loads in several ways. These include configuring a zone with only a limited number of lights (or lighting devices—e.g. signs, etc.), appliances or other loads. In accordance with the invention, a zone may be defined as a collection of lights/lighting devices and other electrical loads logically grouped together. Loads may be grouped together for various reasons, including likelihood of being used together, power consumption, time of day of expected use, location, existence of alternatives and so forth. The lighting devices and the loads in a zone may be controlled by input devices of the zone with operability configured by a load and lighting controller. Further, the lighting system controller may be responsive to a rigid, predetermined and/or programmable logic that may also control the loads in the zone.

A zone output (e.g. a control signal or relay contact state which controls whether certain lighting devices and/or appliances should be operating) is determined by the load controller based on the zone inputs and the rigid, predetermined logic provisioned for the zone. However, many companies that are managing costs of operating lighting devices and appliances on their premises need a more robust, flexible logic and other capabilities for a zone than is provided by the prior art systems, methods, and devices. For example, in accordance with embodiments of the present disclosure, certain dynamically changing operational needs of the company throughout the day and transitory working environment of the company facility throughout the year have been recognized and improved operational characteristics relating thereto are provided.

Further, in accordance with embodiments of the present disclosure, it has been recognized that there is a need for systems, devices, and methods of controlling lighting and appliances on a company (i.e. customer) premises based on configuration rules and new related methodologies such as sensors reporting to the load controller.

BRIEF DESCRIPTION OF THE DRAWINGS

The accompanying figures, together with the detailed description below, are incorporated in and form part of the specification, and serve to further illustrate embodiments of concepts that include the claimed invention, and explain various principles and advantages of those embodiments.

FIG. 18 is a block diagram of a portion of an exemplary method of controller operation illustrating the application of rules mediated according to priority to the output state of the controller panel contactors in accordance with the present invention;

Figure 1A:
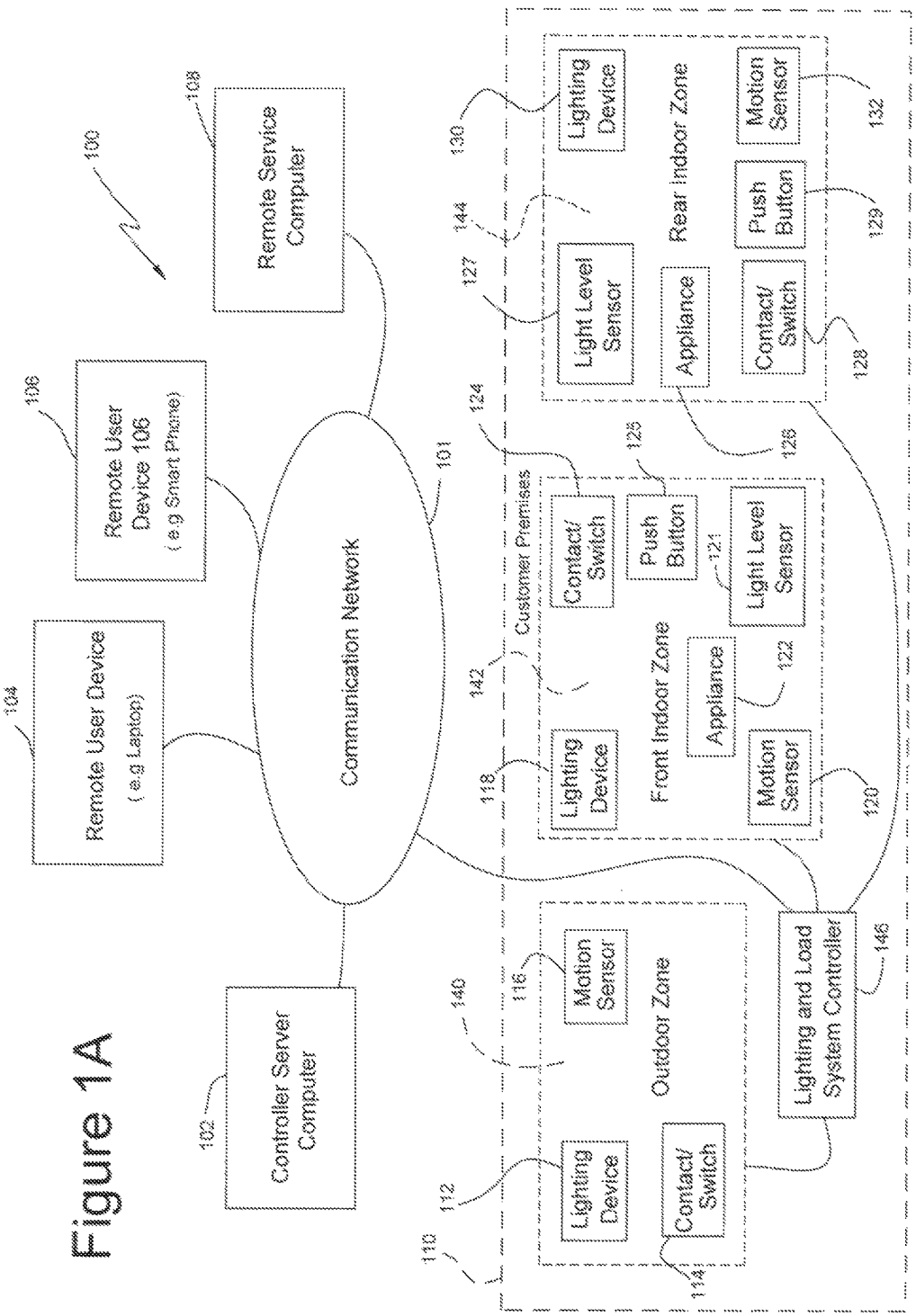
FIG. 1A is a block diagram of a system for controlling lighting and appliances on customer premises based on configuration rules in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The illustrative embodiments described in the detailed description, drawings, and claims are not meant to be limiting. Other embodiments may be utilized, and other changes may be made, without departing from the scope of the disclosure. It will be readily understood that the aspects of the present disclosure, as generally described herein, and illustrated in the Figures, can be arranged, substituted, combined, separated, and designed in a wide variety of different configurations, all of which are explicitly contemplated herein. Further, in the foregoing description, numerous details are set forth to further describe and explain one or more embodiments. These details include system configurations, block module diagrams, flowcharts, and accompanying written description. While these details are helpful to explain one or more embodiments, those skilled in the art will understand that these specific details are not required in order to practice the embodiments.

As will be appreciated by one skilled in the art, aspects of the present disclosure may be embodied as an apparatus that incorporates some software components. Accordingly, some embodiments of the present disclosure, or portions thereof, may combine one or more hardware components such as microprocessors, microcontrollers, or digital sequential logic, etc., such as a processor with one or more software components (e.g., program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein as "modules." The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms. Such is the case with a controlling "web app" that may be used by remote users to remotely control loads, and/or remotely program configuration rules, and/or remotely implement other rule and/or control functions.

The present disclosure describes embodiments of systems, devices and methods for controlling lighting and appliances on a customer premises based on configuration rules. Such embodiments include methods receiving at least one configuration instruction and selecting one or more participant zones from a plurality of zones (that designate predefined sections of one customer premise) which are to be responsive to a configuration rule as described more fully below. The inventive system, operating in accordance with the inventive method, thus controls loads in the selected zones based upon the received configuration instruction and stored output control configuration rules of the zones. Such configuration instruction may be based upon time, sensor and other inputs. Accordingly, from configuration instruction associated with the selected participant zones, at least one output load configuration may be generated and outputted based upon the selected participant zone(s), the received configuration instruction, and the stored output control configuration rules of the selected participant zones.

Moreover, such embodiments, in addition to the above methods, include apparatus for a lighting and load system controller that includes a communication device receiving one or more configuration instruction(s), for example over CAT5 cable. A processor is coupled to the communication device, which selects the participant zone(s) from multiple zones that designate predefined sections of the customer premises. Based upon the received configuration instruction(s) and the stored output control configuration rules of the zones, the processor generates and outputs at least one output configuration based upon the selected participant zone(s), the received configuration instruction, and the stored output control configuration rules of the selected participant zones.

FIG. 1A is a block diagram of a lighting and load system 100 for controlling lighting and appliances on customer premises 110 based on configuration rules in accordance with some embodiments. The customer premises 110 may be a merchant store that has, for example, optionally existing installed lighting and appliance control system(s) from a lighting control manufacturer. The merchant store may be a small business, a national retailer, countrywide fast food chain or any company premises that has a lighting system. Such a customer premises 110 has, for example, a lighting and appliance control system (purchased from and possibly installed by a third party manufacturer/distributor) to manage costs and expenses due to the electricity consumption of lighting and appliances on the customer premises 110. The present disclosure discusses, inter alia, aspects of a lighting, appliance and other load control system. However, the present disclosure, may at times refer to such a lighting and load control system, collectively, as a lighting control system, or as a lighting and appliance control system, or simply as a load control system. However, persons of ordinary skill in the art would understand that a control system may control a variety of different electrical loads.

The customer premises 110 may have several different lighting devices, sensors, devices, appliances and the like that are managed or responded to by the lighting and load system 100. Such devices may be situated in an outdoor zone 140 and include a lighting device or lighting system or assembly 112, a contact/switch 114 (for example, for receipt of direct control from an individual), and a motion sensor 116 (for example, for detecting motion in a zone and turning on lighting or other systems).

A front indoor zone 142 may include a further lighting device or lighting system or assembly 118, a motion sensor 120, a light level sensor 121, an appliance 122, a contact/switch 124 (which may be actuated upon a door opening or closing) and a pushbutton 125. A rear indoor zone 144 may include an appliance 126, a light level sensor 127, a contact/switch 128, a pushbutton 129, a lighting device 130, and a motion sensor 132.

Further, lighting and load system 100 may include a lighting system controller 146 that includes a main panel, and may be located either outdoors or indoors and performs control functions as discussed in greater detail in connection with the description of FIGS. 11 and 12.

Further, the present invention contemplates that customer personnel on or off premises may configure lighting and load system 100 into one or more zones, as illustrated in the above description by way of example. That is, a zone is a collection of lighting devices and appliances logically grouped together. Moreover, a zone can be configured with a name by store personnel. Thus, referring to FIG. 1A, the lighting devices and appliances (112-132) are configured into three zones, namely outdoor zone 140, front indoor zone 142, and rear indoor zone 144.

In a preferred embodiment, a set of output control configuration rules are stored in the memory of the inventive lighting and load system controller 146. Further, in a set of embodiments, store personnel may configure lighting and load system controller 146 (thereby configuring the lighting and load system) using the main panel used as a user interface. In another set of embodiments, store personnel may configure or may provide configuration instructions to the lighting and load system controller 146 using a remote user interface on a remote user device such as a laptop computer, a desktop computer, a tablet computer, a smartphone, or any other computing device, for example directly and/or through a remote computer server. As shown in FIG. 1A, the remote user interface may be on a laptop computer 104 or on a smartphone 106. In accordance with a preferred embodiment of the invention, a remote controller server receives such inputs from the above user interfaces (for example over the Internet) and relays configuration instructions from the remote user device(s) 104-106 via the Internet 101 or other communications network.

Such configuration of the lighting and load system 100 may include configuring the three zones—outdoor zone 140, front indoor zone 142, and rear indoor zone 144 (as illustrated in FIG. 1A). Such configuration may include naming the zone for ease-of-use. Further, the lighting and load system controller 146 may be configured to have each zone associated with one or more input devices. An input device is any appliance that is used to determine or otherwise control the operation (or not) of an output device, and/or the operating characteristic, such as the intensity of a light source. For example, an input device may be a motion sensor, light sensor, a temp/humidity sensor, a contact/switch, or a clock/timer. Also, as an example, an output device may be a contactor for relay to control a lighting device or an appliance (stove, refrigeration unit, etc.). The output device may also, as well, be a switch. Thus, the input devices for outdoor zone 140 include the contact/switch 114 (for example, a door operated contact switch) (a contactor or light level sensor, temp/humidity sensor), and motion sensor 116. The output device may be lighting device 112. Other input devices may light sensors and push buttons. Further, the input devices for front indoor zone 142 include motion sensor 120 and contact/switch 124, and the output devices are contactor(s) to control lighting device 118 and appliance 122. In addition, the input devices for rear indoor zone 144 include contact/switch 128 and motion sensor 132 while the output devices include contactor(s) to control appliance 126 and lighting device 130.

In another set of embodiments, configuration instructions provided by store personnel to the lighting load system controller 146 configure each of the input devices of a zone. Further, the lighting load system controller 146 configures the one or more output devices based on one or more zone output states that are in turn determined by the one or more zones, operation (or not) as well as the status of the one or more input devices, the configuration instructions provided by the store personnel, and output control configuration rules. The output control configuration rules may include a priority of different actions/indications of different parts of the lighting and load control system.

The main panel may include a (switch logic) matrix module that has one or more inputs and one or more outputs. The matrix module determines zone output states based on the inputs. In accordance with a particularly preferred embodiment of the invention, the main panel incorporating controller 146 is capable of having networked sensors on accessory ports, for example all connected together by CAT5 cable. In addition, the main panel is capable of having a display panel that has LCD and buttons on a display port. Moreover, the main panel is capable of having an expansion board that has extra outputs on the expansion port.

In accordance with a preferred embodiment of the invention, the main panel can identify accessories plugged into the accessory ports automatically. This can be done using a multi-wire cable which functions as a data bus. In a preferred embodiment, CAT5 cable is employed because of its wide availability in a diverse range of forms with and without terminating hardware. CAT5 cabling is also desirable because of the wide availability of components such as boxes, junctions, switches, crimp connectors, boots, couplers, cable management panels and connection blocks, wiring blocks, and dedicated tools such as crimpers and testing kits. In accordance with the preferred embodiment, certain conductors are used to carry data and other conductors are used to perform control functions such as triggering a particular device (such as a sensor, switch, etc.) to download its data (digitally in accordance with preferred embodiment) to lighting and load system controller 146. CAT5 cable may be used to carry voltage to power accessories, where required, ground signals and data signals. Further, the main panel may have one or a plurality of dry contact inputs for receiving data in digital or binary form, or as a simple state indication, such as the output of a mechanical single pole single throw switch which, for example, could indicate that a door or window is open or closed, or whether a lock is latched. Likewise, analog inputs are optionally included on the panel, as are dedicated inputs, such as for fire alarms. In accordance with the preferred embodiment, analog inputs are used for temperature, light level, carbon dioxide input, pressure and the like, but are not used for fire alarms or the like. The invention contemplates the use of accessories which may be any input device or any output device.

Further, as alluded to above, the lighting load system controller 146 includes, is integrated with, or otherwise coupled/connected to a main panel. In some embodiments, the main panel incorporates the controller (i.e. a network controller) as one of its subsystems. In this embodiment, the main panel communicates with the lighting and load system controller 146 on a serial or wireless communication bus.

Where an installation includes multiple main panels (which may be located at a single location or at locations which are remote from each other) an additional device may be included to act as a data concentrator.

In certain embodiments, the main panel may have perhaps as many as ten (or, in principle, even more) output zones that can be used to operate lighting devices, appliances, and other output devices. Additional embodiments may include the main panel having an expansion port to add more zones.

Each zone may be mapped to an output contactor or multiple contactor(s) and is configurable as described herein and/or as is known in the art. In certain embodiments, a portion of the matrix module is configured for different zones. In some embodiments, there may be up to 16 inputs to the matrix module for a zone. In other embodiments, the number of inputs for a zone may be up to 16 while other embodiments may expand the number of inputs from 16 to a number greater than 16. In certain embodiments, the main panel, such as the panel illustrated in FIG. 11, is user programmable, but may also store a setting or set of settings in main panel memory for each input device or output device for purposes of, for example, backup or redundancy. Thus, when an input device or output device is replaced, the replacement device is identified by the main panel and the main panel configures or restores the setting of the replacement device from main panel memory to continue operation of the lighting and load system with minimal disruption of operation. in principle, the replacement device could be recognized on the basis of the proximity in time with which a device is removed and another accessory comes online. In accordance with a preferred embodiment, however, each accessory has dipswitches that determines it's logical node ID. If an accessory is not functioning and replaced, as long as the new accessory is set to the same node ID with its dipswitches, the main panel will treat it as a replacement and restore settings into it from the data backup.

An example set of types of output control configuration rules that may be an input to the matrix module of the main panel, in order of priority, include: alarm, manual override, demand response load control, dry contact, light harvesting, program schedule, and zone type rules. Further, preconfigured zone type rules may include: "always off", "work lights", "sales lights", "sign lights", "miscellaneous lights", and "toggle lights", which would follow preconfigured, and what would be expected to be largely likely acceptable, parameters. The matrix module of the main panel enumerates from low to high priority of the inputs to determine the state of each output for a zone. Further, when an output load device is determined to be in an "on" state, light harvesting rules may be implemented to lower the intensity of or turn off the lighting device (or turn off some lighting devices in a zone while leaving others on) if there is enough natural light in the area determined by a light sensor located substantially close or near the output lighting device. If there are any configuration errors, the main panel reports such error to the remote user interface in the remote user device (104-106).

Further, the lighting load system controller 146 is, optionally but in accordance with a preferred embodiment, coupled to the remote user devices (104-106) over a communication network 101, such as the Internet. Remote user devices each have an application with a graphic user interface for managing the lighting system and lighting system controller 146. Further, any instructions (e.g. configuration instructions) from the remote user interfaces on the remote user devices (104-106) may be communicated to the lighting system controller 146 through a controller server 102. Of course, while the Internet is shown as an example of implementation of the invention, it is contemplated that communication may be over a company network, a local network, or other private network. The communication network 101 may thus be any type of communication network known in the art including, but not limited to, a network that implements Transport Control Protocol (TCP)/Internet Protocol (IP) protocols (e.g. an IP network) or Cellular wireless communication.

In addition, when a part or an aspect of the lighting and load system 100 is malfunctioning and needs to be repaired or replaced, the lighting system controller 146 detects such a malfunction and reports the malfunction as a service request for the part (e.g. input device, output device, system and main panel components, failed lighting, (for example in response to a light detector showing no light despite lights being controlled to be in an on state), failed heating (e.g. detected by a temperature sensor), etc.). The lighting load system controller 146 may report a malfunction to the display of the main panel or to a remote user interface on a remote user device (104-106). Further, the lighting load system controller may request service or report the malfunction to controller server 102 which may then determine (based on its prior configuration) to route the service request or malfunction report to a remote service computer 108. Such a remote service computer 108 may then generate a service request or malfunction report to service personnel to repair, replace, or otherwise service the part at issue. Service personnel may be store personnel, personnel from the third party manufacturer/distributor, or other service personnel.

Figure 1B:
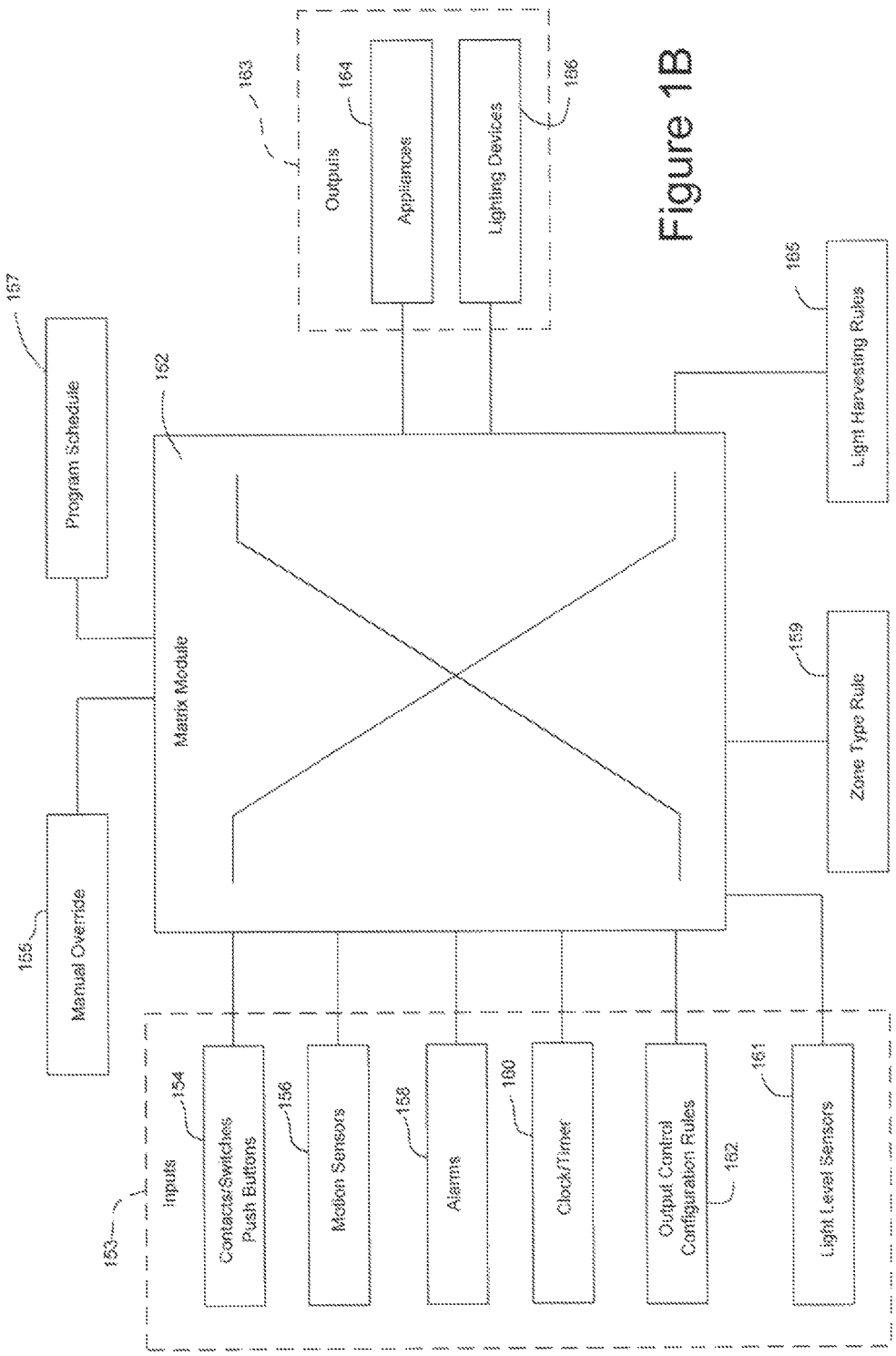
FIG. 1B is a block diagram of a matrix module of a main panel of a lighting/load system controller with inputs and outputs used in controlling lighting and appliances on customer premises based on configuration rules in accordance with some embodiments.

FIG. 1B is a block diagram of portions of the inventive system including a matrix module 152 of a main panel of a lighting system controller 146 (such as that shown in FIG. 1A) with inputs 153 and outputs 163 used in managing the operation of lighting devices and appliances on customer premises based on configuration rules in accordance with some embodiments. The inputs 153 of the matrix module 152 may include, but are not limited to, one or more contacts/switches 154, one or more motion sensors 156, alarms 158, one or more clocks/timers 160, light sensors 161, and output control configuration rules 162 stored in memory of the lighting system controller. However, additional inputs may include a manual override 155, program schedule 157, and zone type rule 159 stored in the main panel or lighting system controller. The outputs 163 may control appliances 164 and lighting devices 166. The matrix module 152 may have a zone output state that corresponds to each of the output devices (164-166). However, the zone output state of a lighting device may be further modified based on light harvesting rules stored in the main panel or lighting system controller. The output control configuration rules may include a priority of inputs. An example priority may be the following: (1) alarm; (2) manual override; (3) demand response load control; (4) dry contact; (5) light harvesting; (6) program schedule; (7) zone type rule (e.g. hard logic), which will be discussed in detail in the flowcharts FIGS. 5-10.

Figure 2:
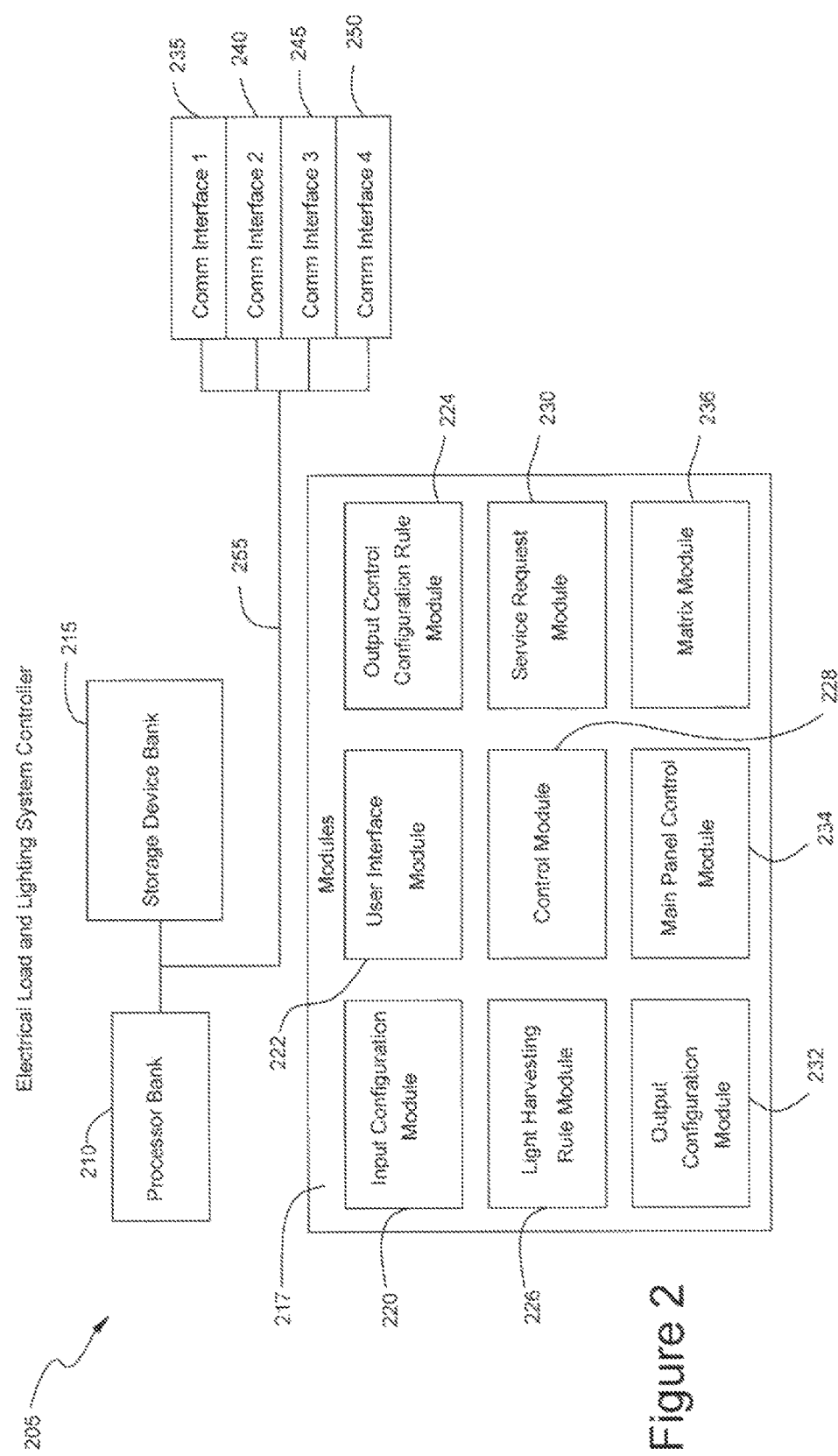
FIG. 2 is a block diagram of a lighting/load system controller system for controlling lighting and appliances on customer premises based on configuration rules in accordance with some embodiments.

FIG. 2 is a block diagram of a lighting and load system controller 205 for controlling lighting and appliances on customer premises based on configuration rules in accordance with some embodiments. Such a lighting load system controller 205 may be used in the system shown in FIG. 1A. The lighting load system controller 205 may be coupled to a control interface on the main panel. Further, the lighting load system controller 205 may include or be coupled to several different components such as a processor bank 210, storage device bank 215, and one or more software applications. These software applications may be executed by a processor within the controller to specifically-configure the operation of modules 217, and one or more communication interfaces (235-250). The processor bank 210 may include one (or more processors that may be co-located with each other or may be located in different parts of the lighting load system controller 205). The storage device bank 215 may include one or more storage devices. Types of storage devices may include memory devices, electronic memory, optical memory, and removable storage media. The one or more modules 217 (for example software modules) may include an input configuration module 220, user interface module 222, output control configuration rule module 224, light harvesting rule module 225, control module 228, service request module 230, output configuration module 232, main panel control module 234, and matrix module 236. The modules 217 may be implemented by the one or more processors in the processor bank 210.

The input configuration module 220 receives inputs, some of which are from various input devices. Further, the input devices may include contacts/switches, motion sensors, alarms, clock/timer, and light sensors whose inputs are provided through the one or more communication interfaces (235, 240, 245, 250). Other inputs may be instructions or commands provided by personnel that include manual override commands, a program schedule, and zone type rules. All or some of the inputs may be gathered by the input configuration module 220 and provided to the matrix module 236.

A user interface module 222 may implement various system functions that include receiving instructions and commands provided by personnel from a remote user interface on a remote user device over a communication network or through one or more communication interfaces. Further, the user interface module 222 may provide status or send messages regarding some of the input devices, output devices, or other aspects of the lighting load system to the remote user device (through the one or more communication interfaces. In some embodiments, the user interface module 222 may receive instructions and commands provided by personnel from a main panel coupled to the lighting load system controller 205 through one or more communication interfaces. Such instructions may revise or modify output control configuration rules, light harvesting rules, configuration instructions for the input devices, or configuration instructions for configuring output devices (that are inputs to the matrix module 236). In addition, the user interface module 222 may provide status or send messages regarding some of the input devices, output devices, or other aspects of the lighting load system to the main panel.

Output control configuration rule module 224 may store, modify, access and provide a set of output control configuration rules stored in the storage device bank 215 or some other storage or memory device coupled to the lighting system controller 205. The output control configuration rule module 224 may provide such output control configuration rules as an input to the matrix module 236, and may be made responsive to priorities and zone rules as detailed herein.

The output control configuration rules allow the matrix module to resolve a "collision" of different inputs. For example, an alarm input may dictate turning on a lighting device inside a retail store premises, however, a program schedule input may dictate that the same lighting device must be turned off because it is after closing time of the retail store. Thus, there is a "collision" of inputs between the alarm and the program schedule that contradict in a current operation of the lighting device. The output control configuration rules may list a priority scheme, such as that detailed above, that an alarm input takes priority over the program schedule. Thus, the matrix module 236 may turn on the lighting device accordingly.

The light harvesting rule module 226 may store, modify, access and provide a set of light harvesting rules stored in the storage device bank 215 or some other storage or memory device coupled to the lighting system controller 205. Light harvesting rule module 226 may be coupled to one or more indoor and outdoor light sensors located throughout the retail store premises. Further, the light harvesting rule module 226 may receive input data that includes the intensity of light detected by indoor and/or outdoor light sensors. In addition, the light harvesting rule module 226 may determine whether the matrix module 236 zone output state corresponding to an output lighting device may be turned on. Moreover, the output lighting device may be located substantially close to one of the indoor and outdoor light sensors. Based on received input data that include the intensity detected by the light sensor substantially close to the lighting device, the light harvesting rule module 226 may decrease or increase the intensity of the output lighting device through the operation of matrix module 236.

Control module 228 includes software and hardware functions that assist in performing certain tasks for the lighting and load system controller 205, such as providing access to a communication link (e.g. wired, wireless, Bluetooth, infra-red, RF, etc.), executing an operating system, managing software drivers for peripheral components, and processing information. In addition, the control module 228 may also include software drivers for peripheral components, user interface computer programs, and debugging and troubleshooting software tools. Also, the control module 228 may include an operating system. Such operating systems are known in the art for such a lighting load system controller 205 but may also include computer and computing device operating systems (e.g. Android, iOS, Windows Mobile, QNX, Windows, Mac OS, Mac OS X, Linux, Unix, etc.).

The service request module 230 may generate a service request to repair or replace a part of the lighting or load system (including sensors and other accessories) as discovered by store personnel or by personnel of a service company, third party manufacturer/distributor of the lighting system. Such service request may be originated in response to observation made by store personnel, and/or, in principle, in response to an artificial intelligence algorithm which monitors device outputs, perhaps compares them to each other, factors in local conditions and then makes a determination respecting whether the device is likely operating properly. Further, the service request may be generated based on an alarm perhaps indicating that the retail store premises needs examination (e.g. a potential intruder after hours) or assessing various aspects of the lighting system. Such a service request may be generated automatically by the lighting and load system controller 205 based on an alarm, trigger, alert or status notification generated by the lighting and load system. Alternatively, the service request may be generated by store personnel monitoring the lighting system and the lighting load system controller through the main panel or a remote user interface on a remote user device. Such a service request may be sent to the remote user interface on the remote user device, main panel, or a service computer server so as to dispatch personnel to respond to the service request.

The output configuration module 232 receives configuration information, such as a zone output state corresponding to an output device from the matrix module 236, to either turn on, turn off, or provide some power to one or more output devices (e.g. appliances and lighting devices, etc.). The light harvest rule module 226 may modify the zone output state and thereby the operation (or lack thereof) of an output device based on the light harvesting rules and the receiving of the light intensity of one or more light sensors.

The main panel control module 234 is coupled to the main panel display and main panel user interface, which may be on the door of a metal box containing the inventive controller. The main panel control module 234 may be used to display the status of one or more input devices, such as temperature sensors, light sensors, switches, etc., and output devices, such as contactors, as well as access other inputs such as the program schedule, output control configuration rules (e.g. zone has certain contactors assigned to it and some may be on while others may be off perhaps as a function of time of day), zone type rules (e.g. if the store's door for the entry of the public is open, turn on the sales floor lights), light harvesting rules, etc. Moreover, the main panel control module 234 may receive instruction from the main panel to modify such inputs or configure input devices. Further, the main panel control module 234 may display alarms, triggers, alerts, and status notifications of various aspects of the lighting system. In addition, the main panel control module 234 may allow store personnel to generate a service request or display a list of service requests.

The matrix module 236 receives input information from various sources such as input configuration information from the input configuration module 220, output control configuration rule information from the output control configuration rule module 224, configuration instructions from the user interface module 222 and/or the main panel control module 234. Based on such inputs, the matrix module 236 determines a set of output states for one or more zones of the lighting system under current conditions. Each zone output state may correspond to an output device. The set of zone output states may be provided to the output configuration module 232, which in turn sets the configuration (e.g. turn on, turn off, configure to some intermediate setting (e.g. intermediate light intensity of a lighting device)) of the output device(s) of the zone(s).

Each of the communication interfaces (235-250) may be software or hardware associated in communicating to other devices. The communication interfaces (235-250) may be of different types that include a user interface, USB, Ethernet, Wi-Fi, WiMax, wireless, optical, cellular, Serial, RF Network Connection (Bluetooth, Zigbee, Mesh, etc.), Wired and Wireless IP Network Connection (e.g. 6lowpan, etc.), or any other communication interface coupled to a communication network. One or more of the communication interfaces (235-250) may be coupled to a user interface known in the art.

An intra-device communication link 255 between the processor bank 210, storage device bank 215, modules 217, and communication interfaces (235-250) may be one of several types that include software, and/or a bus or/or other communication mechanism.

Figure 3:
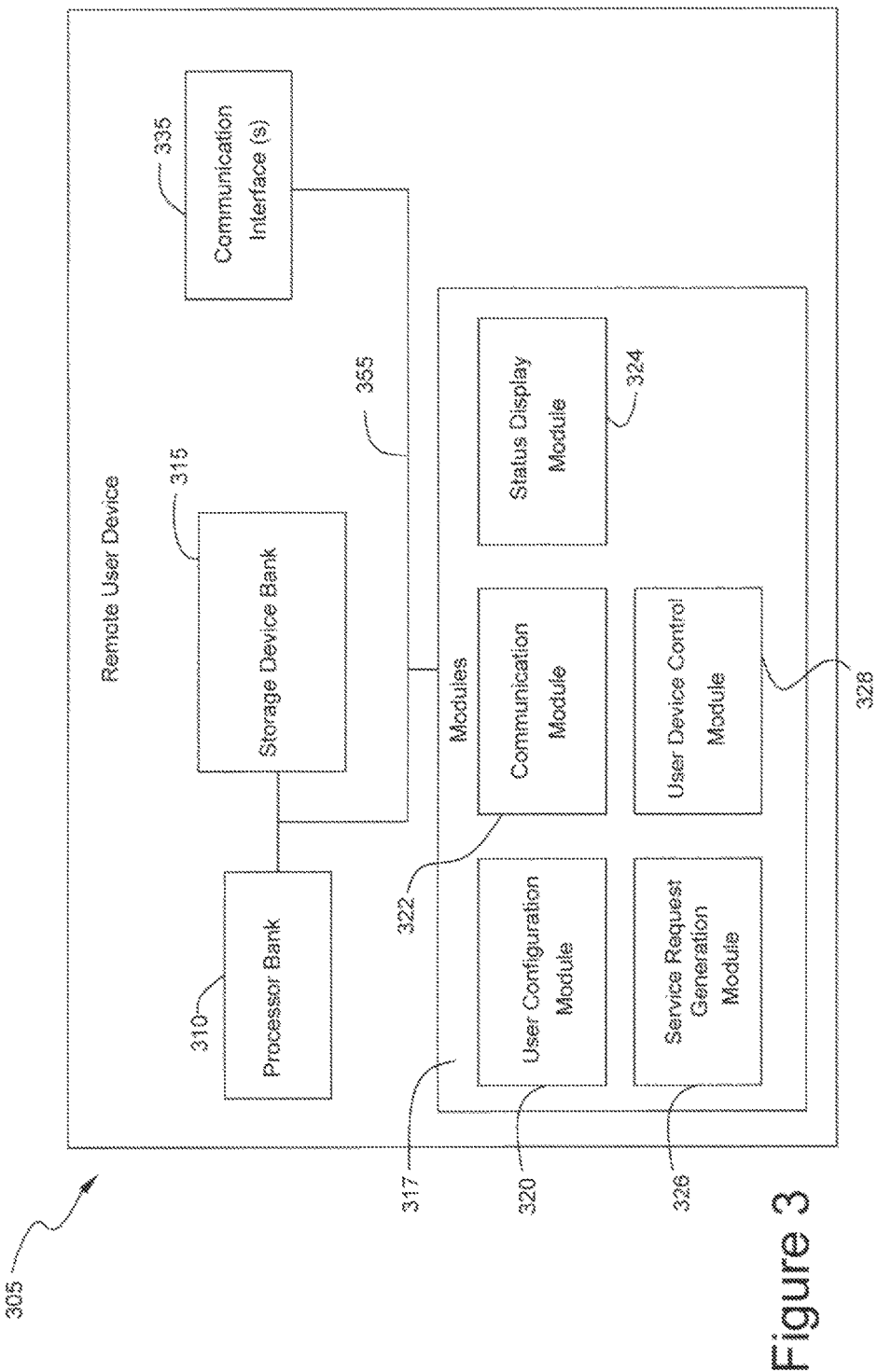
FIG. 3 is a block diagram of a remote user device that is used in a system for controlling lighting and appliances on customer premises based on configuration rules in accordance with some embodiments.

FIG. 3 is a block diagram of a remote user device 305 that is used in a system for controlling lighting and appliances at a customer premises based on configuration rules in accordance with some embodiments. Such a remote user device 305 may be used in the system shown in FIG. 1. The remote user device 305 may be a laptop computer, desktop computer, tablet computer, smartphone, or any other computing device. Further, the remote user device 305 may include several different components such as a processor bank 310, storage device bank 315, one or more software applications, which may be executed by a processor to form specifically-configured module devices 317, and one or more communication interfaces 335. The processor bank 310 may include one or more processors that may be co-located with each other or may be located in different parts of the remote user device 305. The storage device bank 315 may include one or more storage devices. Types of storage devices may include memory devices, electronic memory, optical memory, and removable storage media. The one or more modules 317 may include a user configuration module 320, communication module 322, status display module 324, service request generation module 326, and user device control module 328. The modules 317 may be implemented by the one or more processors in the processor bank 310.

The user configuration module 320 receives configuration instructions from a user, such as store personnel, through a user interface. The configuration instructions may include the operation (or lack of operation) of certain input devices and output devices of the lighting system as well as, but not limited to, output control configuration rules, program schedule, zone type rules, manual overrides, status request of various aspects of the lighting load system, and light harvesting rules.

Communication module 322 may provide the configuration instructions from the user configuration module 320 to the lighting system/lighting load system controller over a communication network through the one or more communication interfaces 335. The communication module 322 may use certain standard or proprietary protocols or formats to provide the configuration instructions to the lighting system/lighting load system controller. Alternatively, the communication module 322 receives status of various aspects of the lighting system (either from the lighting system controller or some other part of the light system) including the input devices and output devices. Such status information may be sent using certain standard or proprietary protocols or formats from which the communication module can extract the status information and provide such status information to the status display module 324 to display such status information on a display of the remote user device 305.

The service request generation module 326 generates a service request to be sent to the lighting load system controller and/or a remote service computer. The service request may be sent to the lighting load system controller, such that upon a request by store personnel from the main panel, the lighting load system controller can list pending and completed service requests. Further, the service request may be sent to the remote service computer so that service personnel may be dispatched and respond to the service request. Such service personnel may be store personnel, personnel from the third party manufacturer/distributor of the lighting load system, or some other service personnel. A service request may be generated upon instructions received by a user in real-time or automatically based on previously stored service generation rules onto the remote user device 305 (e.g. if an LED goes out for a lighting device, automatically generate a service request).

The user device control module 328 includes software and hardware functions that assist in performing certain tasks for the remote user device 305 such as providing access to a communication link (e.g. wired, wireless, Bluetooth, infrared, RF, etc.), executing an operating system, managing software drivers for peripheral components, and processing information. In addition, the user device control module 328 may also include software drivers for peripheral components, user interface computer programs, debugging and troubleshooting software tools. Also, the user device control module 328 may include an operating system. Such operating systems are known in the art for such a remote user device 305 but may also include computer and computing device operating systems (e.g., Android, iOS, Windows Mobile, QNX, Windows, Mac OS, Mac OS X, Linux, Unix, etc.).

Each of the communication interfaces 335 may be software or hardware associated in communicating to other devices. The communication interfaces 335 may be of different types that include a user interface, USB, Ethernet, Wi-Fi WiMax, wireless, optical, cellular, Serial, USB, RF Network Connection (Bluetooth, Zigbee, Mesh, etc.), Wired and Wireless IP Network Connection, or any other communication interface coupled to a communication network. One or more of the communication interfaces 335 may be coupled to a user interface known in the art.

An intra-device communication link 355 between the processor bank 310, storage device bank 315, modules 317, and communication interfaces 335 may be one of several types that include software, a bus or other communication mechanism.

Figure 4:
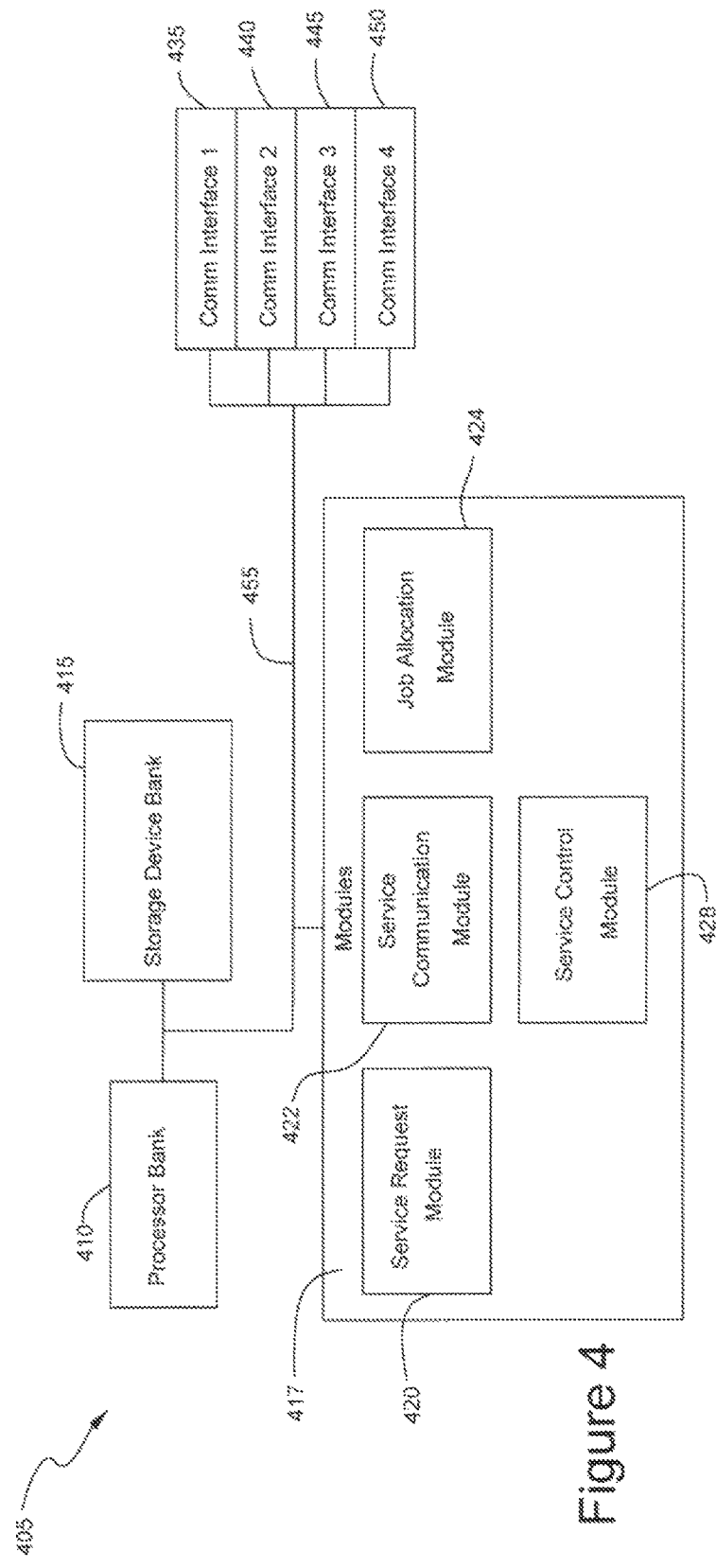
FIG. 4 is a block diagram of a service computer that is used in the inventive system for controlling lighting and appliances on customer premises.

FIG. 4 is a block diagram of a service computer 405 that is used in a system for lighting and load system controller system for controlling lighting and appliances on customer premises based on configuration rules in accordance with some embodiments. Such a service computer 405 may be used in a system shown in FIG. 1. The service computer 405 may be a laptop computer, desktop computer, tablet computer, smartphone, or any other computing device. Further, the service computer 405 may include several different components such as a processor bank 410, storage device bank 415, one or more software applications, which may be executed by a processor to form specifically-configured module devices 417, and one or more communication interfaces (435-450), such as a USB port, keyboard interface, network connection, etc. The processor bank 410 may include one or more processors that may be co-located with each other or may be located in different parts of the remote user device 405. The storage device bank 415 may include one or more storage devices. Types of storage devices may include memory devices, electronic memory, optical memory, and removable storage media. The one or more modules 417 may include a service request module 420, a service communication module 422, a job allocation module 424, and a service control module 428. The modules 417 may be implemented by the one or more processors in the processor bank 410.

The service communication module 422 may receive service requests and associated information from a lighting system or a remote user device. Such service requests and associated information may be sent using certain standard or proprietary protocols or formats from which the service communication module 422 can extract and provide to the service request module 420. Further, the service communication module 422 may transmit service job information provided by the job allocation module 424 to a computing device (e.g. smartphone, tablet, laptop, computer, etc.) of personnel (store, manufacturer, distributor, etc.).

The service request module 420 receives service requests from the service communication module 422 and processes the service requests. The processed service requests are provided to the job allocation module 424.

The job allocation module 424 further processes the service requests to determine which type of personnel are to receive the service request. For example, if a lamp needs replacement, then the job is allocated to onsite service personnel. However, if a part in the lighting load system controller is damaged, then the job may be sent to manufacturer personnel to be assessed then repaired or replaced.

The service control module 428 includes software and hardware functions that assist in performing certain tasks for the service computer 405 such as providing access to a communication link (e.g. wired, wireless, Bluetooth, infrared, RF, etc.), executing an operating system, managing software drivers for peripheral components, and processing information. In addition, the service control module 428 may also include software drivers for peripheral components, user interface computer programs, debugging and troubleshooting software tools. Also, the service control module 428 may include an operating system. Such operating systems are known in the art for such a service computer 405 but may also include computer and computing device operating systems (e.g. Android, iOS, Windows Mobile, QNX, Windows, Mac OS, Mac OS X, Linux, Unix, etc.).

Each of the communication interfaces (435-450) may be software or hardware associated in communicating to other devices. The communication interfaces (435-450) may be of different types that include a user interface, USB, Ethernet, Wi-Fi, WiMax, wireless, optical, cellular, Serial, USB, RF Network Connection (Bluetooth, Zigbee, Mesh, etc.), Wired and Wireless IP Network Connection, or any other communication interface coupled to a communication network. One or more of the communication interfaces (435-450) may be coupled to a user interface known in the art.

An intra-device communication link 455 between the processor bank 410, storage device bank 415, modules 417, and communication interfaces (435-450) may be one of several types that include a bus or other communication mechanism.

Figure 5:
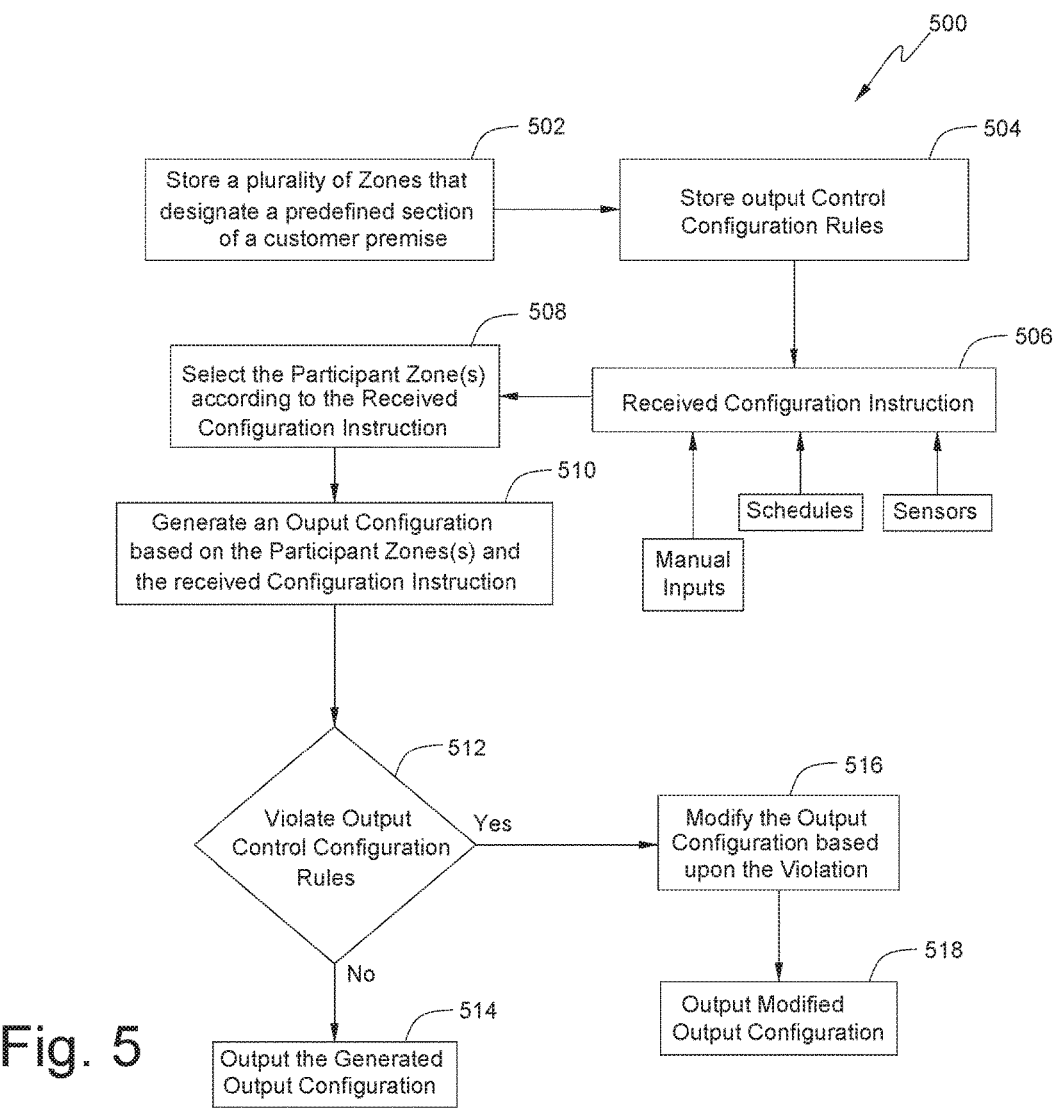
FIGS. 5-10 are flowcharts of methods of controlling lighting and appliances on customer premises based on configuration rules in accordance with some embodiments.

FIG. 5 shows a method 500 for controlling lighting and appliances on customer premises based on configuration rules in accordance with some embodiments. Specifically, method 500 is implemented in the lighting/load system controller 205 that works with various lighting and appliances on the customer premises, as shown in FIG. 2. Using the lighting system controller 205, a plurality of zones that designate a predefined section of the customer premise is stored (Step 502) in the storage device bank 215 of the lighting system controller 205 (shown in FIG. 2). Additionally, a plurality of output control configuration rules are similarly stored (Step 504) in the storage device bank 215, as one particular embodiment. As one skilled in the art can readily appreciate that the data does not have to be stored with the hardware of the lighting system controller 205, especially when used within Internet networks and cellular networks, data can be stored a variety of ways depending upon the specific network implementations.

Method 500 is initiated by the receipt of a configuration instruction (step 506). In response to a received configuration instruction (for example an existing rule newly user-amended rule, a manual input, a sensor output, and so forth), one or more participant zones are selected from the stored plurality of zones that designate a predefined section of the customer premise (step 508). After the participant zones have been selected (step 508), an output configuration is generated based upon the selected participant zones and the received configuration instruction (step 510). For this exemplary embodiment shown, it is determined whether the generated output configuration violates the stored plurality of output control configuration rules for the various zones (Step 512). If not, the generated output configuration will be outputted to one or more devices (Step 514) as a response to the received configuration instruction (step 506). If, however, a violation is found with the generated output configuration (step 512), method 500 modifies the generated output configuration in order to resolve the violation detected (step 516) (for example following the above exemplary priority scheme). The modified output configuration is then outputted to the device(s) (Step 518) in place of the generated output configuration.

Example zone type rules may include, but not limited to, "Always Off", "Work lights", "Sales lights", "Sign Lights," "Miscellaneous lights," and "Toggle lights." By having the zone type rule have lowest priority, the zone type rule may be the input for the default setting of certain lighting devices and appliances that output devices for the zone. A zone type rule being "Always Off" may be an input to the matrix module 152 (shown in FIG. 1B) such that certain lighting devices and appliances are always not in operation unless other higher priority inputs (e.g. program schedule) are provided. Analogously, a zone type rule being "Work lights" may be an input to the matrix module 152 such that certain lighting devices 166 and appliances 164 are always operational, especially those lighting devices used in the work space of the premises unless other high priority inputs (e.g. program schedule) are provided.

In addition, a zone type rule being "Sales lights" may be an input to the matrix module 152 such that certain lighting devices 166 and appliances 164 are always operational, especially those lighting devices used to display products and services on the premises unless other higher priority inputs (e.g. program schedule) are provided. Moreover, a zone type rule being "Sign lights" may be an input to the matrix module 152 such that certain lighting devices such as indoor or outdoor signage are always operational on the premises unless other higher priority inputs (e.g. program schedule) are provided. Also, a zone type rule being "Miscellaneous lights" may be an input to the matrix module 152 such that certain lighting devices and appliances are always operational, especially those lighting devices used in areas on the premises that may require lighting or appliances in operation for a substantial period of time (e.g. refrigeration unit) unless other higher priority inputs (e.g. program schedule) are provided. Further, a zone type rule being "Toggle lights" may be an input to the matrix module 152 such that certain lighting devices and appliances are operational by way of a switch by store personnel.

Referring now to FIGS. 6-10, specific embodiments of the output control configuration rules for the various zones of the customer premise(s) are shown, which includes (1) Alarm; (2) Manual Override; (3) Demand Response Load Control; (4) Dry Contact; (5) Program Schedule; (6) Zone Type Rule (e.g. hard logic), as previously introduced in FIGS. 1 and 2. All these functions together work seamlessly with the zones of the customer premise as a centralized system for load demand control and program scheduling that is more efficient and customized to the customer premise.

Figure 6:
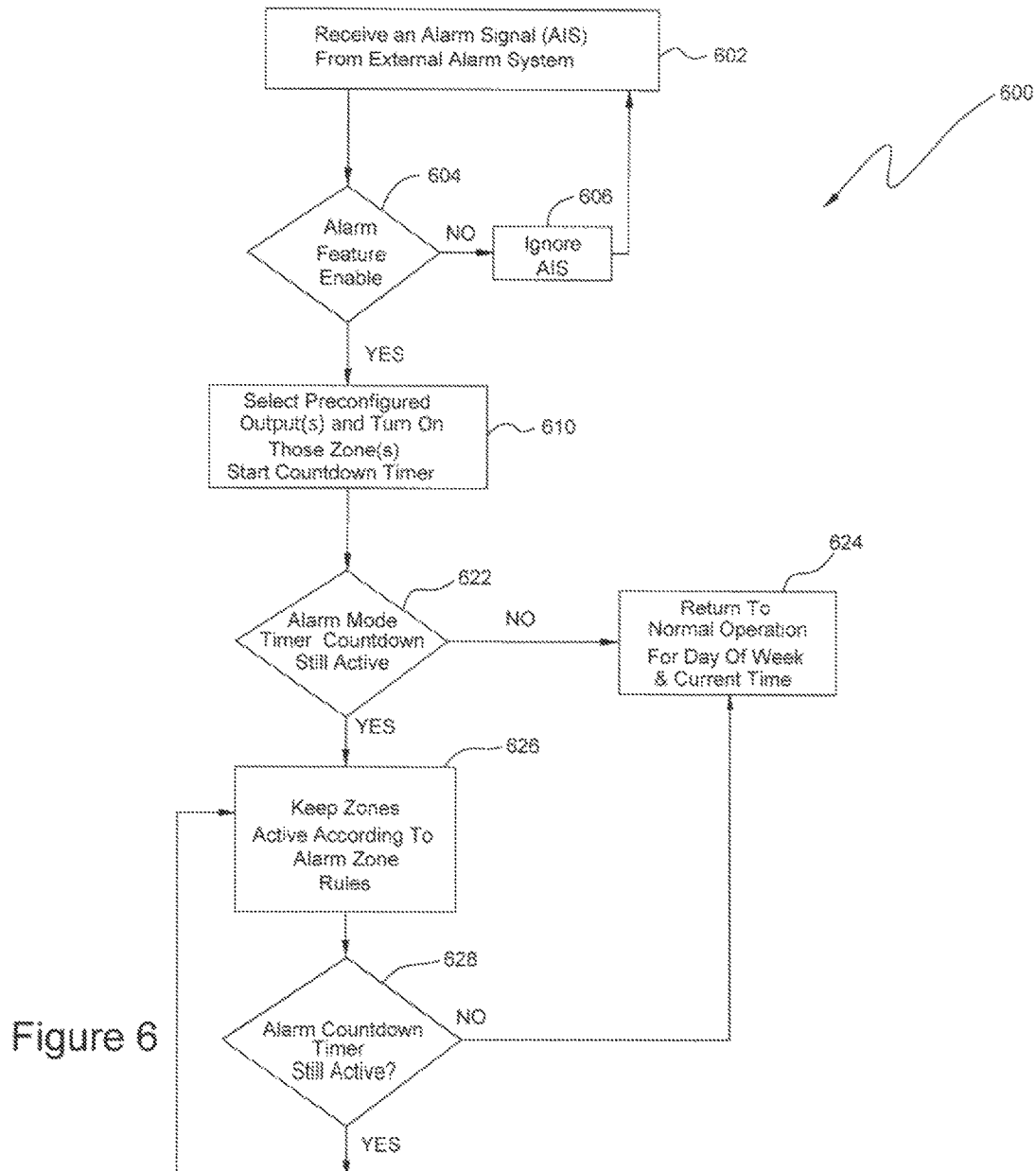

In particular, referring to FIG. 6, a method 600 for alarm functions is shown. In this particular embodiment shown, an alarm input signal (AIS) is received from an external alarm system (step 602), which triggers method 600 to initiate. A determination is first made to ensure that the alarm is actually enabled (step 604), and if not, the AIS will be accordingly ignored (step 606), which loops back to wait for another AIS (step 602).

If the alarm is found enabled at step 604, at step 610 the system selects a predetermined configuration previously determined for the particular alarm and starts an alarm mode countdown timer. At step 622, at The end of the countdown period the alarm is not still active, nothing further is done, and the method 600 loops back at step 624 to wait for a next AIS (step 602), and clear the AIS active state for the zones.

Once the AIS active state is cleared for the zones, method 600 loops back again to wait for the next AIS from the external alarm system (step 602).

When, in contrast, the alarm is still active at step 622, zone outputs are configured as required by the alarm zone rule at step 626. At this point, another alarm mode timer may be implemented, which determines again whether the alarm mode timer is set (step 628). If the alarm mode timer is set after the second timer times out, at step 628, output states are maintained in the alarm configuration upon system return to step 626, the second time out period is repeated. Decisional step 628 is then repeated at the end of the timeout period. If it is next determined that the alarm is not enabled at Step 628, then there is nothing to do for these zones with disabled alarms, which loops the method 600 back to wait again for the next AIS at step 624). For each of the selected participant zones with enabled alarm, the AIS is set as active according to the output control configuration rules of the selected participant zone, which causes the method to loop back to wait for the next AIS.

In one example of this alarm mode function for a customer premises that is a retail store. The retail store may have operating hours from 9 am to 9 pm every day. Further, store personnel arrive at 8am each day to prepare for each day and leave 10 pm each day to clean up after the store closes. Thus, a program schedule configured as part of the output control configuration rules stored into memory coupled to the lighting system controller for the lighting and load system for such a retail store may schedule the indoor lights to be turned on at 8am and turned off at 10 pm. Further, there may be an alarm system scheduled to be turned on at 10 pm ET. If there is any attempt to enter the building or turn on any indoor lighting device after 10 pm, then an alarm may be triggered.

Figure 7:
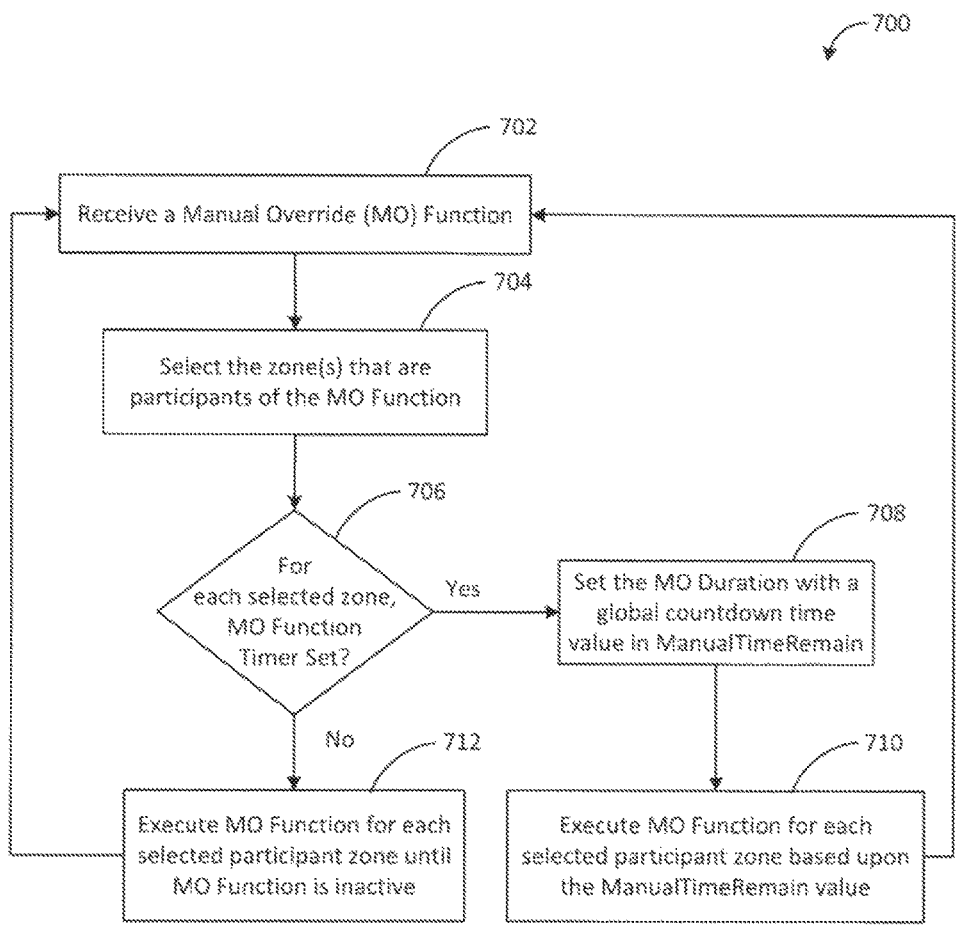

Referring to FIG. 7, method 700, is initiated by the receipt of a manual override function at step 702. This manual override function may be sent from, for example, the lighting load system controller 205 (FIG. 2), the remote user device 305 (FIG. 3), the service computer 405 (FIG. 4), or a third party external system (not shown), depending upon how, what, and who initiated the manual override function. Again, the flexibility of the various implementations is readily known to one skilled in the art. In response to this received MO function, one or more zones that are associated with the MO function are then selected (step 704).

It is next determined whether the MO function includes a timer set for each of the selected participant zone (step 706). For the selected participant zones with the MO timer set, the duration of the MO function is set with a global countdown time value (step 708), which governs execution of the MO function for each of the participant zones according to this global countdown time value (step 710). For the selected participant zones without a count down time, the MO function is simply executed only until the MO function is inactive (Step 712). Once the MO function is executed either with the timer countdown (step 710) or until the MO function is inactive (step 712), method 700 loops back to wait for a next MO function (step 702).

As an example of this MO function, an alarm may notify emergency personnel and/or retail store personnel of the unscheduled entrance of the building and/or the turning on of an unscheduled lighting device. At 11 pm ET the lighting load system controller may be sent two conflicting instructions, one may be an alarm from the alarm system that indicates an unscheduled indoor lighting devices has been turned on and a manual override purported from a trusted retail store personnel to turn off the indoor lighting device. However, due to the priority of scheme that states that an alarm indication has a higher priority than manual override instructions, the alarm persists and emergency personnel and retail store personnel are contacted and may be dispatched to the retail store premises. This increases system security.

Figure 8:
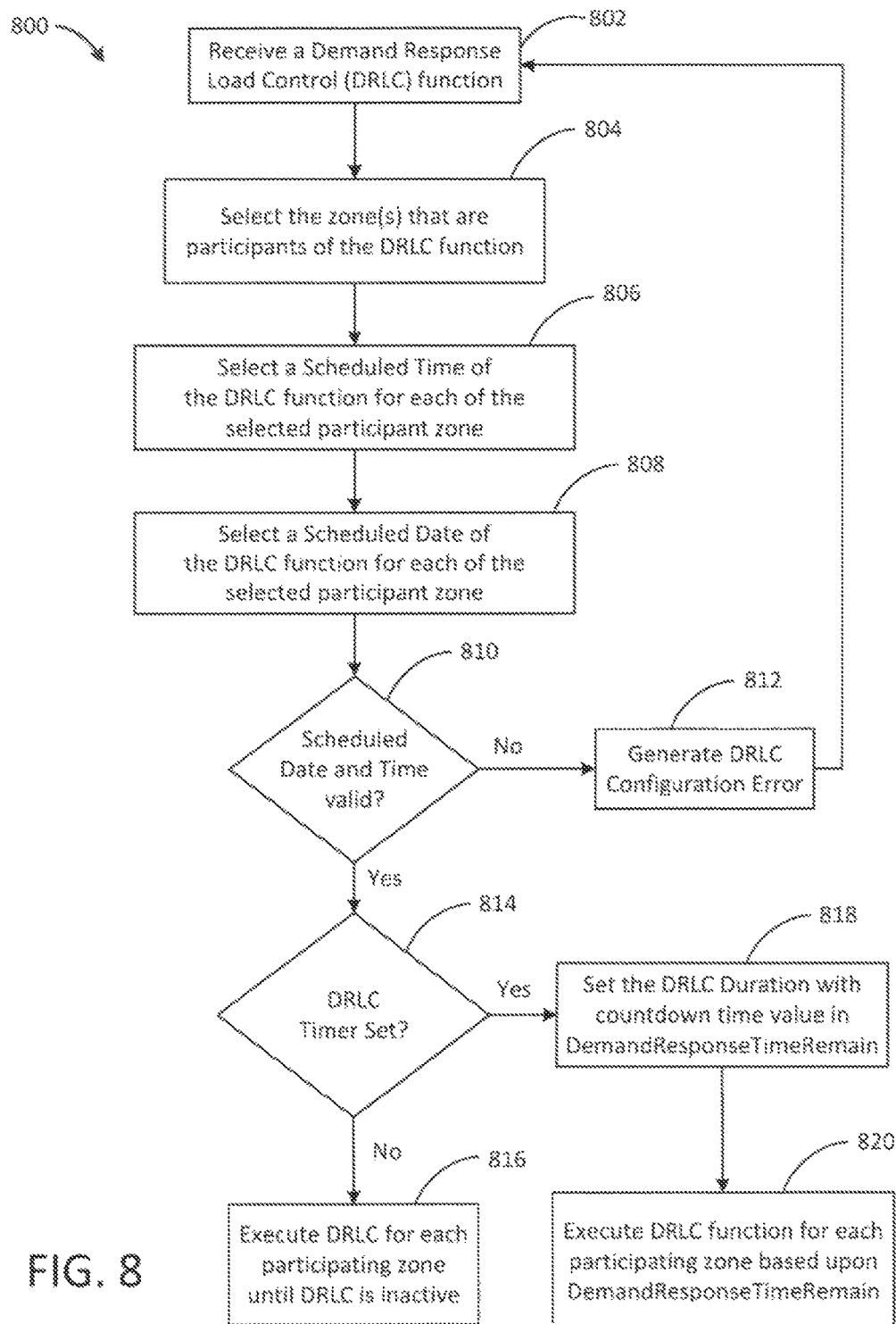

Referring to FIG. 8, a method 800 for a demand response load control (DRLC) function is shown, which is similarly initiated when a DRLC function is received (Step 802). This DRLC function may be sent from a third party external system (not shown), the lighting load system controller 205 (FIG. 2), the remote user device 305 (FIG. 3), and the service computer 405 (FIG. 4), depending upon how, what, and who initiated the manual override function. Again, the flexibility of the various implementations is readily known to one skilled in the art.

In response to the receipt of the DRLC function (step 802), the participant zones with the DRLC function enabled are selected (step 804). A scheduled time (step 806) and date (step 808) of the DRLC function is selected from the plurality of output control configuration rules according to each of the selected participant zones. The validity of the selected scheduled date and time is then checked against the output control configuration rules of the selected participant zones (step 810). If the scheduled date and time of the DRLC function is not valid (step 810), a DRLC configuration error is generated and the DRLC function will be ignored (step 812), which ends the process and loops back to wait the next received DRLC function (step 802).

A DRLC timer may be implemented as an extra control of the DRLC function, like the previously described functions. Again, as well known in the art, the timer may be implemented a various ways, but a particular example is shown for clarity. Also, as one skilled in the art, there are other implementations that may not require a timer check, and these various implementations depend upon the customization needed for the customer premise or the overall systematic implementation of the whole system.

In this particular example, it is determined if the DRLC timer is set for each of the selected participant zones, and if not (step 814), the DRLC function is executed for each participant zone until the DRLC function is inactive (step 816). In other words, since there is no timer control installed, the DRLC function will continue to function until it is either finished or when the DRLC function becomes inactive. If, however, the DRLC timer is set for the selected participant zone (step 814), the duration of the DRLC function is set with a global countdown time value in a demand response time remain value (step 818), which inserts a timer countdown that will execute the DRLC function according to the timer set (step 820), specifically as indicated by the demand response time remain value that has been set.

Figure 9:
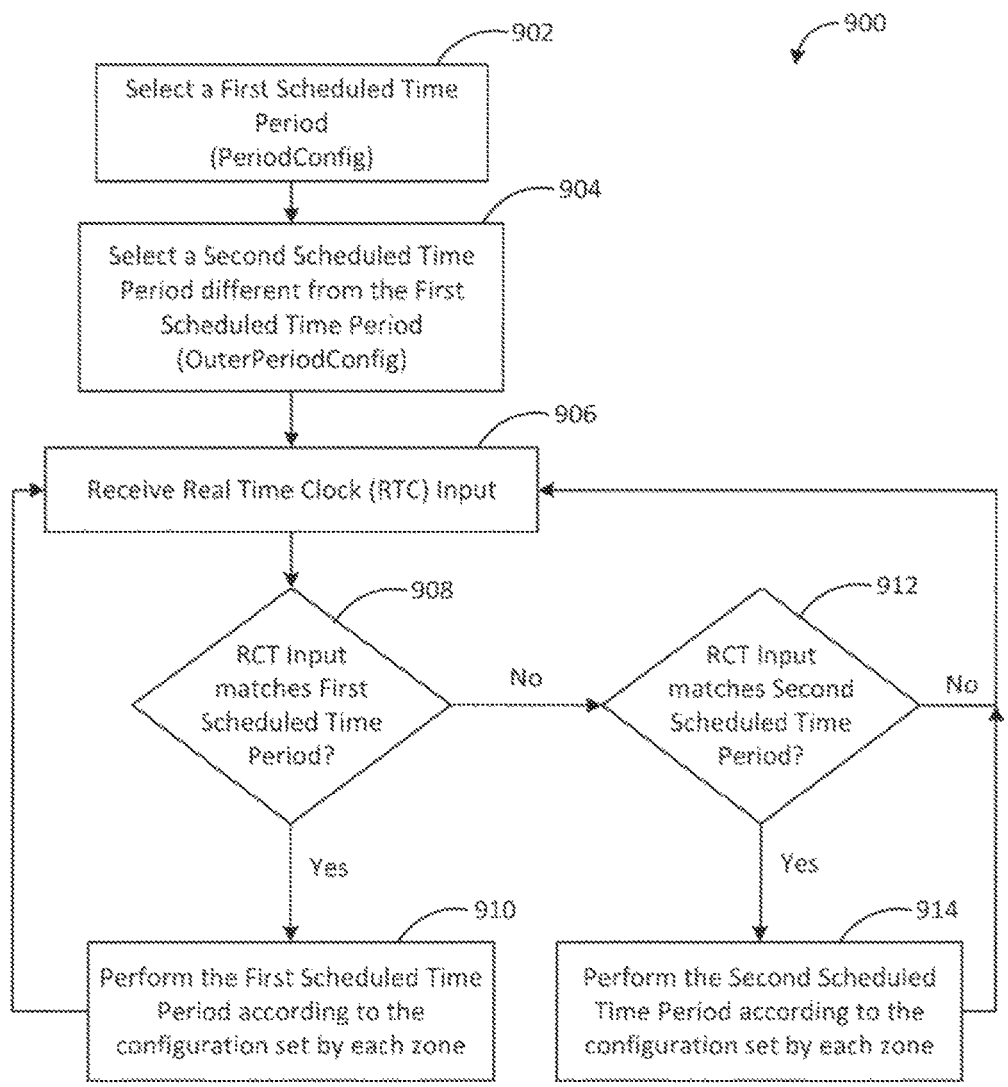

Referring now to FIG. 9, a method 900 for a program schedule function is shown. In this exemplary embodiment, the program schedule function requires two previously selected values of a first scheduled time period (PeriodConfig) (step 902) and a second scheduled time period (OuterPeriodConfig) that is different from the first scheduled time period (step 904). The PeriodConfig itself may include two time periods, and the number of time periods that can be implemented as the PeriodConfig can be greatly varied, which again depends upon the customization of the customer premise and the overall design of the system. To simplify for purposes of explanation, only one time period of the PeriodConfig is shown and discussed, and for multiple time periods implemented, each of the time period of the PeriodConfig is compared to the OuterPeriodConfig, along with the real time clock (RTC) input.

The method 900 is triggered with a receipt of an RTC input (step 908), and based upon the stored first scheduled time period as part of the stored plurality of output control configuration rules of the various zones, it is determined if the RTC input matches the first scheduled time period (step 908). If so (step 908), the first scheduled time period is performed according the stored plurality of output control configuration rules for each of the participant zones (step 910). Method 900 ends with the performance of the first time period (step 910), which then accordingly loops back and waits for a next RTC input (step 906).

If, on the other hand, the RTC input does not match the first scheduled time period (step 908), it is next determined whether the RTC input matches the second scheduled time period that is different from the first scheduled time period (step 912). If there is no match between the RTC input and the second scheduled time period (step 912), the method 900 loops back to wait for the next RTC input before being initiated again (step 906). When there is a match between the RTC input and the second scheduled time period (step 912), the second scheduled time period, which is part of the stored plurality of output control configuration rules for various zones, is accordingly performed according to the provided configuration rules set by each of the participant zone (step 914).

To provide an example how these various functions may work together as a whole, a specific implementation will be discussed. For example, the program schedule function may have the indoor lights turned on from 8 am to 10 pm. The demand response load control function, however, may be enacted as part of the priority scheme. Demand response load control function configures the lighting system to change its electric usage from its normal electric consumption patterns to a more conservation oriented electric consumption in response to changes in the price of electricity over time. Also, electric utilities may provide incentive payments designed to induce lower electricity use at times of high wholesale market prices or when system reliability is jeopardized. As a result, the demand response load control function may only operate half the indoor lighting devices during the hours of 8 am to 10 pm to conserve electric consumption.

Figure 10:
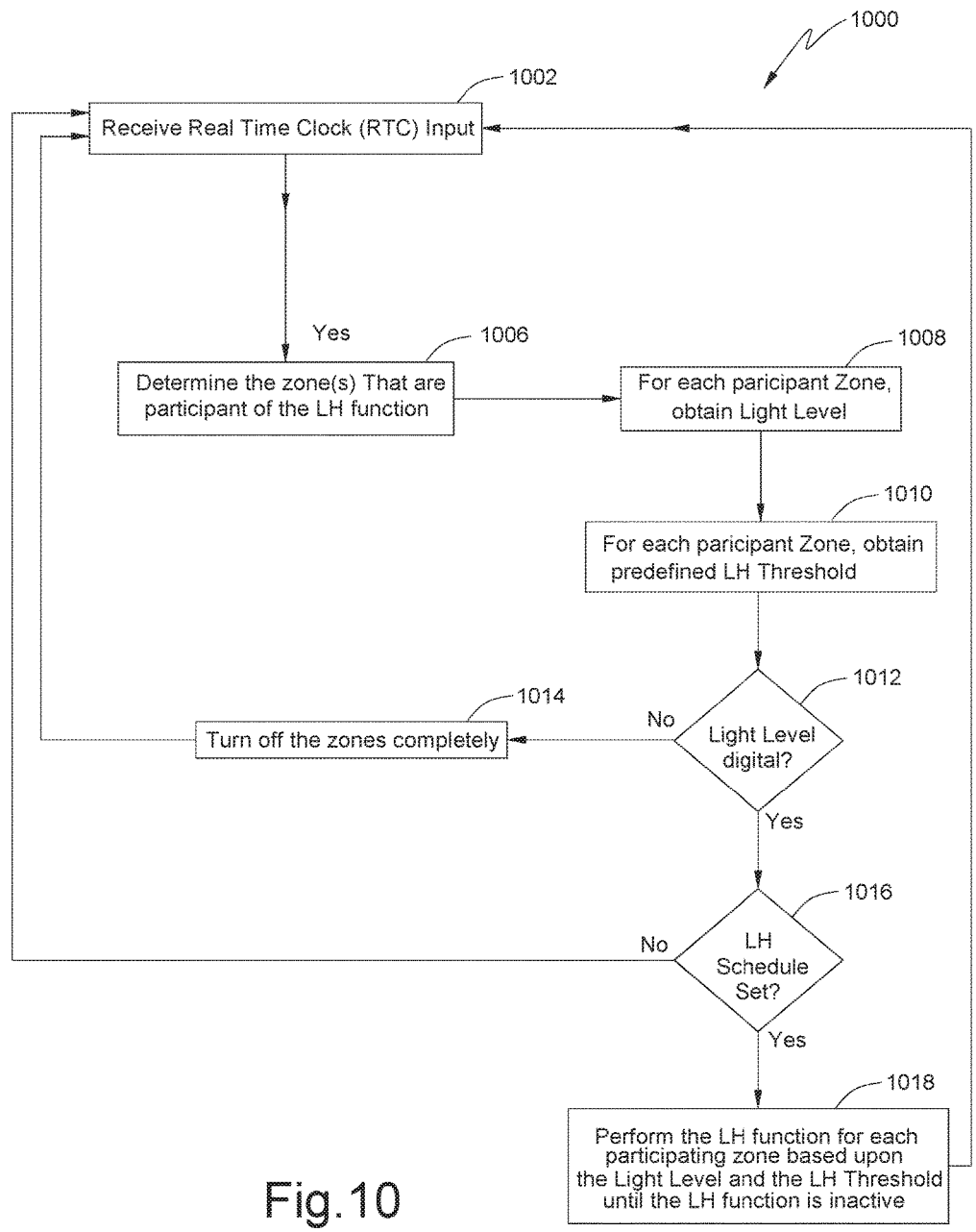

Referring to FIG. 10, a method 1000 for a light harvesting (LH) function is shown. Method 1000 is initiated periodically at step 1002. A scheduled time period for the LH function may also be set, and may be stored as part of the stored plurality of output control configuration rules for the various zones.

According to the stored plurality of output control configuration rules, the participant zones that are enabled for the LH function are then selected (step 1006). For each of the selected participant zones, a light level (step 1008) and a predefined LH threshold (step 1010) are obtained. It is next determined at step 1012 whether lights are scheduled for the current time of day, and if not, the selected participant zones will be turned off completely (step 1014), which ends the method segment 1000 and the system loops back to wait for a next execution of the loop.

If, however, the lights are set to be on at step 1012), a determination as to whether the LH function has been set to occur at step 1016. If the LH schedule is set, at step 1016, the LH function is performed at step 1018 based upon the light level and the LH threshold for each of the participant zones, until the LH function is inactive.

When the LH timer is not set, at step 1016 method 1000 loops back to wait for the next initiation of the loop.

In order to provide a concrete example of the LH function, a specific example will be discussed. Light harvesting rules 165 (FIG. 1B) allows the lighting system controller 205 (FIG. 2) to receive input data such as the natural light intensity detected by indoor and/or outdoor light sensors and determine whether there is sufficient natural light (e.g. sunlight) shining through the windows of the retail store thereby requiring less lighting devices to be in operation or lower the intensity of the light generated by the lighting devices. If it is determined that significant natural light has been detected inside the retail store premises, then the lighting system controller may only turn on one-third of the indoor lighting devices for a period of time (e.g. 8 am-12 noon). After the expiration of the period time, the lighting system controller may reassess the amount of natural light streaming into the retail store premises as indicated by the indoor and/or outdoor light sensors. At such a time, for example, the lighting system controller may configure 60% of the indoor lighting devices for another period of time (e.g. 12 noon to 4 pm).

In another example, the matrix module 236 (FIG. 2) may zone output state for an outdoor lighting device to be turned on based on a program schedule dictating that the outdoor lighting device operational at 5 pm. However, in the spring, 5 pm is not as dark as when the program schedule was determined. Thus, a light sensor located substantially close or near the outdoor lighting device monitored by the light harvesting rule module 226 (FIG. 2) may determine the outdoor daylight intensity is such that the outdoor lighting device should not be turned on. In response, light intensity of the outdoor lighting device may be adjusted. Hence, the light harvesting rule module 226 (FIG. 2) may turn down the intensity of the outdoor lighting device based on the intensity received from the light sensor.

The light harvesting rule module 226 (FIG. 2), as another example, may also receive the intensity detected by the light sensor is low during a particular day (e.g. due to cloud cover of an approaching storm). Pursuant to a program schedule, the matrix module 236 may have the outdoor lighting device turned off during the day. However, the light harvesting rule module 226 may cause the outdoor lighting device to turn on based on the detected low intensity of light determined by the light sensor.

Figure 11:
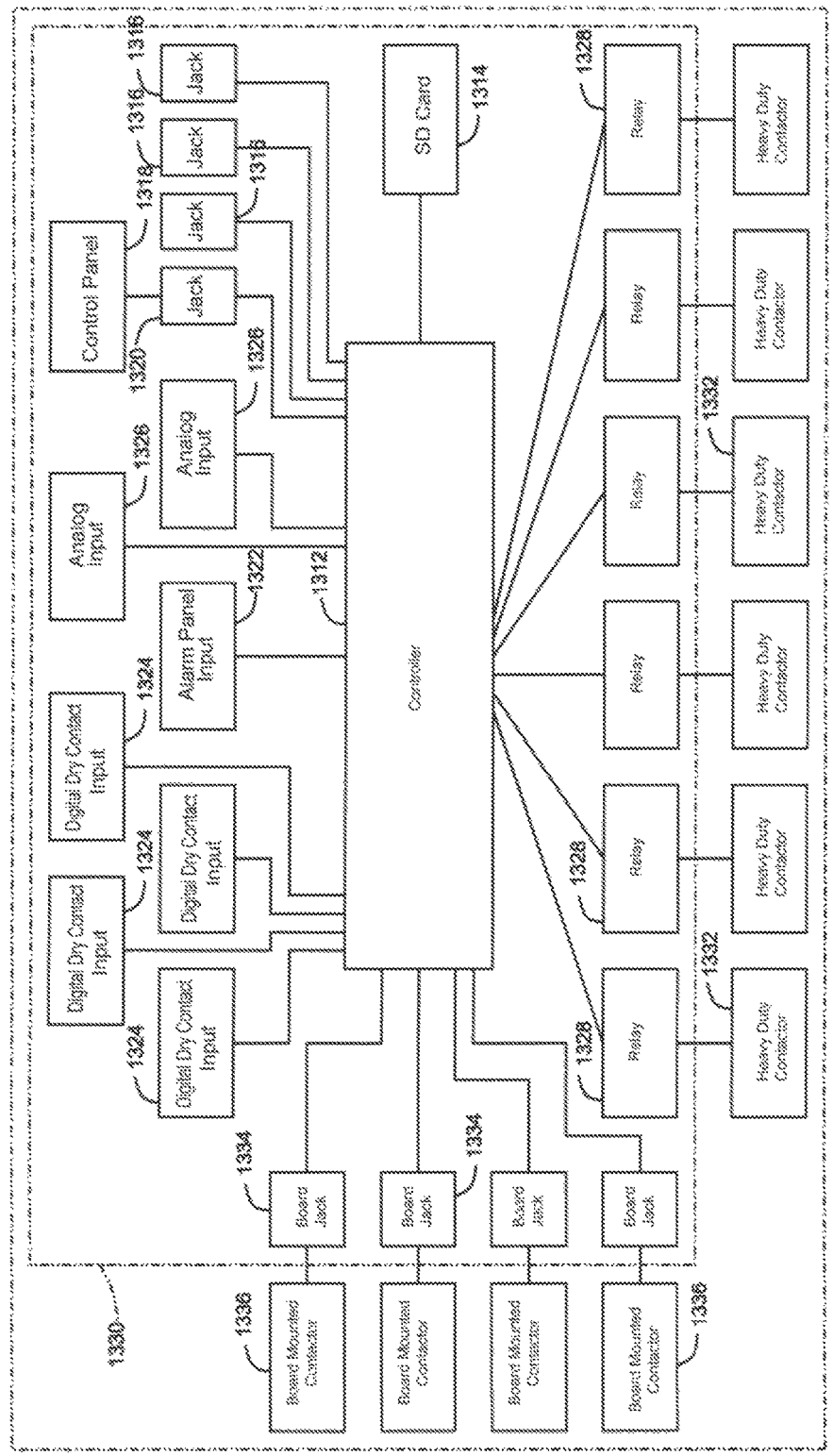
FIG. 11 is a block diagram of a controller to be located at a customer premises.

A particular commercial implementation of the invention in the form of a load control panel 1310 is illustrated in FIG. 11. In accordance with a preferred embodiment, load control panel 1310 is housed within a metal box positioned at the premises to be controlled in proximity to other central components of the power system, such as circuit breakers, the master power switch, and so forth.

In accordance with the invention, the operation of load control panel 1310 is controlled by controller 1312, which may be microprocessor-based and programmed to operate in accordance with the instructions carried by SD card 1314, which implement the methodologies detailed above in connection with the description of the embodiment of FIGS. 1-10. However, a wide range of other options are available, such as a personal computer.

In accordance with one preferred embodiment of the invention, controller 1312 may be made responsive to various control inputs coupled to the system through jacks 1316. More particularly, jacks 1316 provide two-way communication between controller 1312 and, for example, sensor and other input devices. Such devices are responsive to bus master control signals which interrogate the, for example, sensors connected to jacks 1316, to cause them to transmit signals which indicate the nature and value of their output. Some measure of local control may be provided by a control panel 1318 which is coupled to controller 1312 by jack 1320, and allows control or provision of such functions as system status, override current status, initiate a firmware upgrade, display a configuration matrix, display data from the network sensors, initiate a service request and or similar functions.

Controller 1312 is also responsive to an alarm panel input 1322, which may be coupled to an alarm device, such as a smoke detector, or a plurality of smoke detectors which would, depending upon the input, cause a controller to perform various load control (i.e. turning subsystems on and off) and related functions.

Controller 1312 is responsive to digital dry contact inputs 1324 which receives such inputs as signals indicating whether a particular system is on or off or a state of a device, etc. Such systems may include an indicator whether lights are on or off, the state of a door sensor indicating whether a light is on or off. This allows users of the inventive system to program their system to set up a configuration rule, such as an instruction to turn off an area heater if a door is open. Alternatively, the system could be programmed to switch to radiant heat if the temperature drops below a certain value. Such inputs are digital inputs.

In similar fashion, analog inputs 1326 provide analog data information on such things as analog light sensors, pressure sensors, carbon dioxide sensors, and the like. These signals may also be used to enable the end-user to implement customized configuration rules controlling the operation of the system connected to the inventive system 1310. Generally, it is noted that the digital dry contact inputs and the analog inputs, as well as the alarm panel input are one-way communication devices which merely output data continuously. This data is monitored by the controller on a substantially continuous basis.

Output information from controller 1312 is sent to a plurality of relays 1328. The above components may be mounted on a single circuit board 1330. Each of the relays 1328 drives a respective heavy-duty relay or contactor 1332 to turn on or turn off the loads connected to their respective heavy-duty contactor 1332.

Also mounted on circuit board 1330 are a plurality of output jacks 1334. Output jacks 1334 may be used to connect additional respective contactors, for example contactors 1336.

Figure 12:
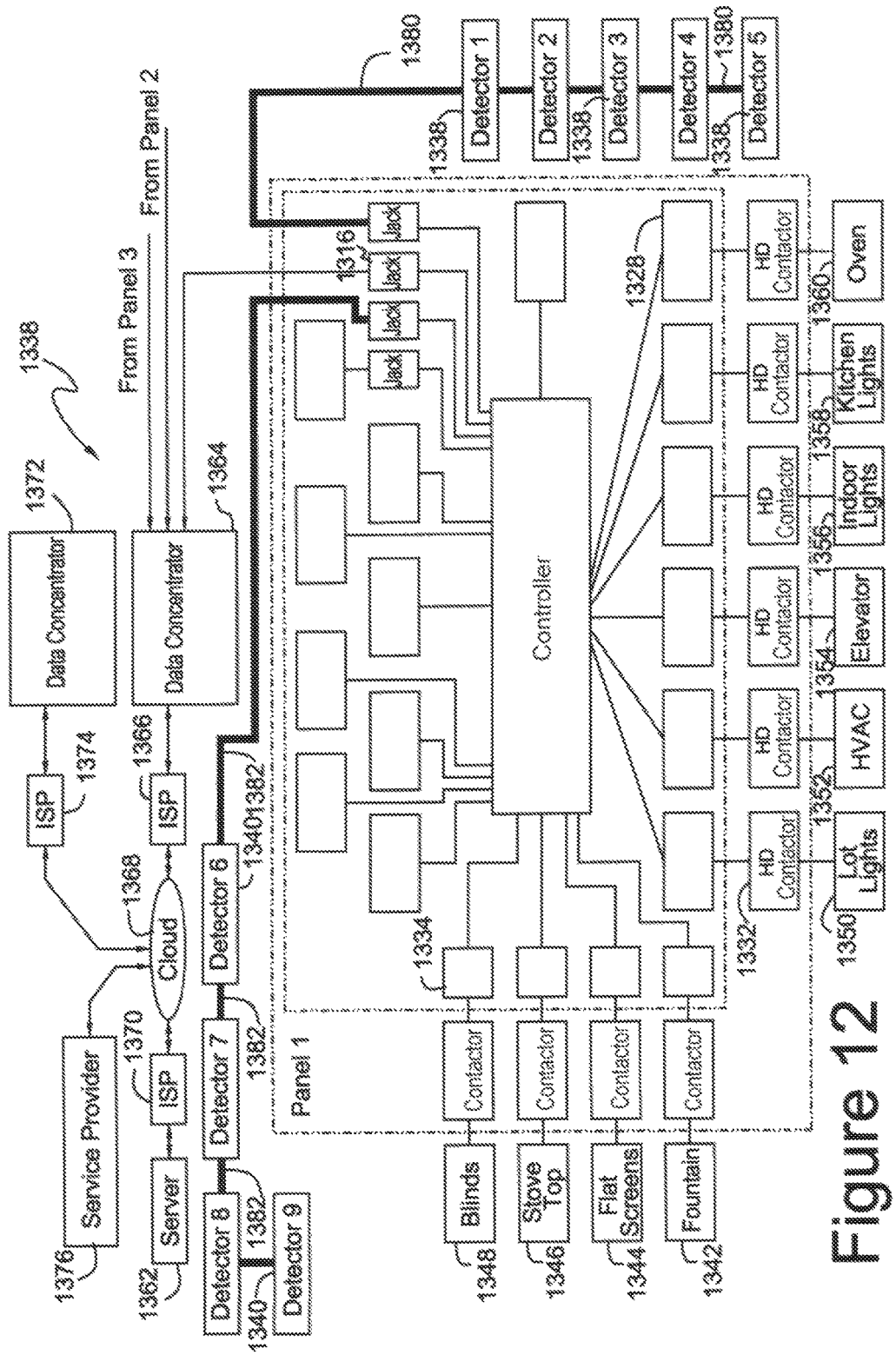
FIG. 12 is a block diagram of an exemplary customer installation using the controller of FIG. 11.

Referring to FIG. 12, an exemplary installation 1338 constructed in accordance with the methodology and systems disclosed in FIGS. 1-10 is illustrated. More particularly, a plurality of detectors 1338, such as a motion detector (for example detecting the presence of personnel and turning on lights), a pushbutton for manually activating lights, and a sensor are connected by wiring to one of the jacks 1316. Such wiring may be ordinary CAT5 cable, which is selected because it is commonly available and has numerous conductors which may be dedicated to such things as data reception, data transmission, and bus master control functions. If desired, a second string of detectors 1340, comprising detectors 6 through 9, may be connected to another jack. In practice, detectors 1338 may be on a single branch extending to the east of load control panel 1310, while the detectors 1 through 5 may be on a second branch extending to the west of load control panel 1310.

Control systems may be coupled to contactor relays 1334 to turn on and off such small load systems as a water fountain 1342, video screens 1344, a stovetop 1346, and window blinds 1348 (which control whether sunlight will be allowed to enter the premises).

Larger loads may be coupled to heavy-duty contactors 1332, and include such things as parking lot lights 1350, HVAC system 1352, elevator 1354, indoor lights 1356, kitchen lights 1358 and oven 1360. Such smaller loads and larger loads are controlled in accordance with the methodologies discussed above in connection with FIGS. 1-10.

In accordance with the invention, it is contemplated that load control panel 1310 will report to and be controlled by a central server 1362. Such information collection and control is facilitated by a communications channel extending between load control panel 1310 and server 1362. More particularly, one of the jacks 1316 is coupled to a data concentrator 1364 which is coupled via an Internet service provider 1366 to the Internet 1368 where the information may be communicated by ISP 1370 to server 1362. Of course, the above illustration using the Internet is just an example of an implementation of the inventive system. Alternatively, the subject system may be implemented completely within a company's private network or control infrastructure.

Data concentrator 1364 performs the function of combining several data streams, for example data from the first load control panel 1310 with additional data from second and third load control panels. Such combination may be done in numerous ways known in the art, for example by time multiplexing, or encoding multiple data streams into a single datastream, for example in a manner which provides redundancy and resultant protection against loss of data.

Moreover, in accordance with the invention, the additional multiple data concentrators 1372 connected to multiple control panels may be connected each by a respective ISP 1374 to server 1362, to provide economies of scale in the management of multiple facilities, perhaps even facilities owned by different parties. Such management may include reprogramming the operating parameters of the system, attending to emergencies, or sending messages to service providers 1376, who can attend to servicing malfunctions in the inventive system or in the loads which the inventive system controls.

Figure 13:
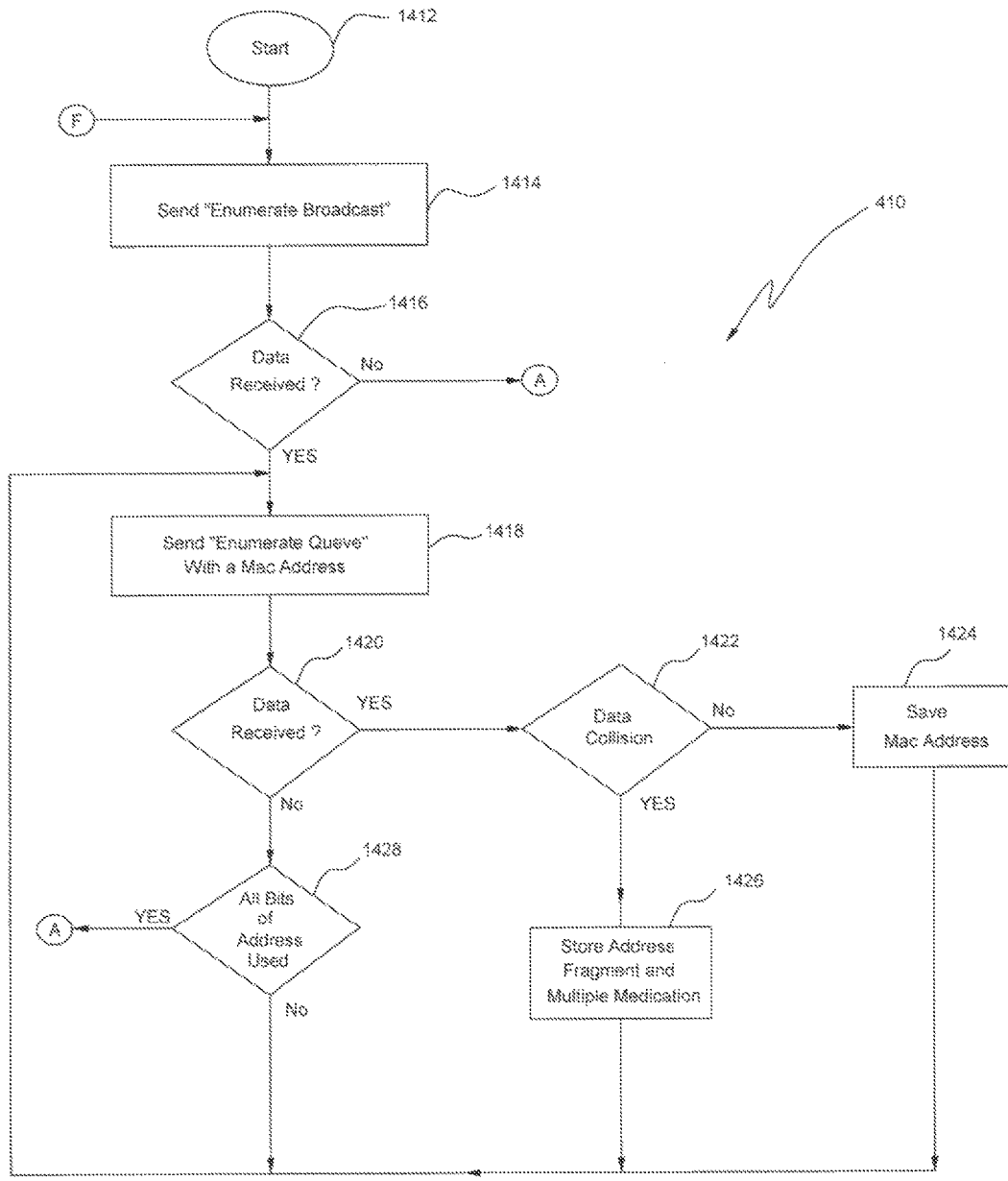
FIG. 13 is a block diagram of a portion of an exemplary method of controller operation illustrating device enumeration in accordance with the present invention.

Referring to FIG. 13 a particularly advantageous methodology 1410 for identifying the accessories 1338, 1340 connected to jacks 1316 is illustrated. Upon initiation of the system at step 1412, an "Enumerate Broadcast" command is sent at step 1414 along buses 1380, 1382 by the bus-master. Buses 1380 and 1382 may be CAT5 cable, and each of the accessories, whether temperature detectors, light level detectors, on-off switches, or the like are connected in parallel. Such connection is made along what is essentially an eight conductor cable extending across the system from each jack, with each detector or other accessory tapping into it to receive power and to receive instructions, as well as to transmit requested information upon receipt of an instruction to do so. In accordance with a preferred embodiment of the invention, buses 1380 and 1382 are connected as a single virtual bus, thus connecting all accessories in the system in parallel.

When the accessories receive the "Enumerate Broadcast" transmission from the bus-master, all accessories on the buses 1380 and 1382 send signals indicating that they are present. If at least one accessory transmits a signal, at decisional step 1416, the system proceeds to step 1418, where the bus-master sends an "Enumerate Query" command. The "Enumerate Query" command is limited to a particular segment of a mac address.

In accordance with the invention, the manufacturer of the inventive system assigns every accessory which it sells a unique mac address. Accordingly, no two devices have the same mac address, and when the mac address segment is transmitted only those devices which have that segment will respond, thus allowing the system to determine whether there are accessories with such a segment in their mac address. More particularly, the query from the bus-master at step 1418 relates, in accordance with the preferred embodiment, to a mac address consisting of three 8-bit binary bytes (in other words 24-bit positions). Accordingly, the inquiry at step 1418 may be a signal to devices with a 1 in the 1st position. If at least one of the accessories have a 1 in the 1st position, data will be received and at decisional step 1420 the system will proceed to decisional step 1422. If, at step 1422 there is no data collision (in other words if data is received from only one accessory), then the system proceeds to step 1424 where the 24-bit mac address 000000000000000000000001 is stored as the address of accessory connected to the system. On the other hand, if there is a data collision, at step 1426 the system stores the determination that more than one device shares a 1 in the 1st position. Once all the addresses having a binary value of 1 in the 1st bit position have been discovered, the system repeats the process to discover all addresses having a 0 in the 1st bit position. The system then returns to set 1418 and moves to the 2nd position to see whether the system is connected to an accessory having a 1 in the 1st position and a value of 1 in the 2nd position. After the system has discovered all devices having a 1 and a 0 in the 1st position, at step 1420 the system will reach a point where no data is received. It then proceeds to decisional step 1428 where it checks to see if all bits in the address have been used. If all bits in the address have not been used, the system then proceeds to step 1418. The system proceeds in this iterative fashion, relying on the stored indication at step 1428 of the existence of multiple devices sharing the fragment (which may be one or multiple positions in the three-byte mac address), allowing the system to sequentially proceed to the left in the 3 byte mac address, until all accessory addresses have been discovered.

Figure 14:
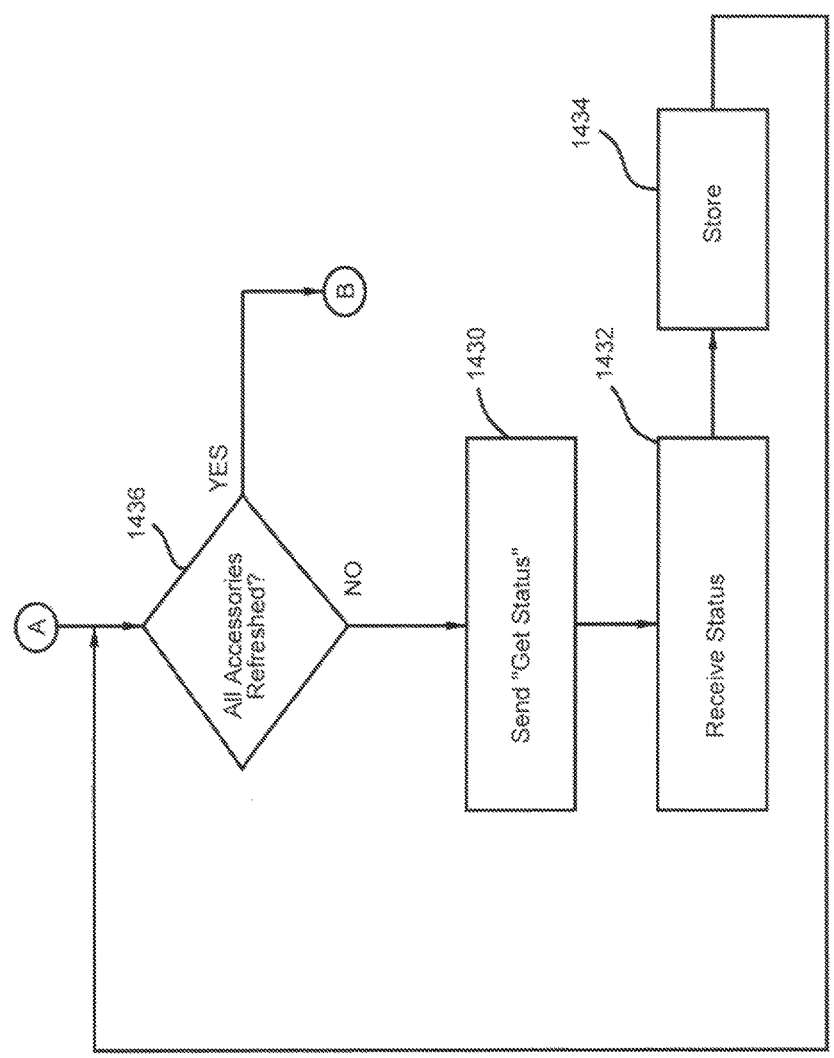
FIG. 14 is a block diagram of a portion of an exemplary method of controller operation illustrating obtaining/updating the status of accessories in accordance with the present invention.

At the point where all addresses have been discovered, the system proceeds as illustrated in FIG. 14. More particularly, at decisional step 1436 the system determines whether there are accessories on the system that need to be refreshed, for example on a first go around or on subsequent go arounds, so that the system can determine on each go around the status of the respective accessory. If at least one of the accessories needs to have its status refreshed, the system proceeds to step 1430, where an individual "Get Status" command is sent by the bus-master, in sequence, to each of the accessories. Status information is received at step 1432. Status information may be device type, device firmware version, device software version, capabilities, connectivity time, and so forth. Such information is stored at step 1434. The system then proceeds back to step 1436 If, on a particular go around, status for all the accessories has been updated, the system proceeds from decision step 1436 to the methodology illustrated in FIG. 15. At decisional step 1442, the system checks to see whether a complete round of changed data updates has been obtained on the particular go around. If a complete set of data updates has not been obtained, the system proceeds to step 1438. The system then does a go around sending a "Get Changed Data" inquiry to the next accessory at step 1438, receiving an update on the data for that accessory at step 1440, and storing the changed data for that accessory at step 1441. This is repeated using the loop illustrated in FIG. 5 until data for all accessories have been refreshed on a particular go around. Data, for various accessories, may comprise the temperature detected by a temperature detector, whether the switches are on or off, the light level detected by the light sensor, the time of the last detected motion, and so forth.

Figure 15:
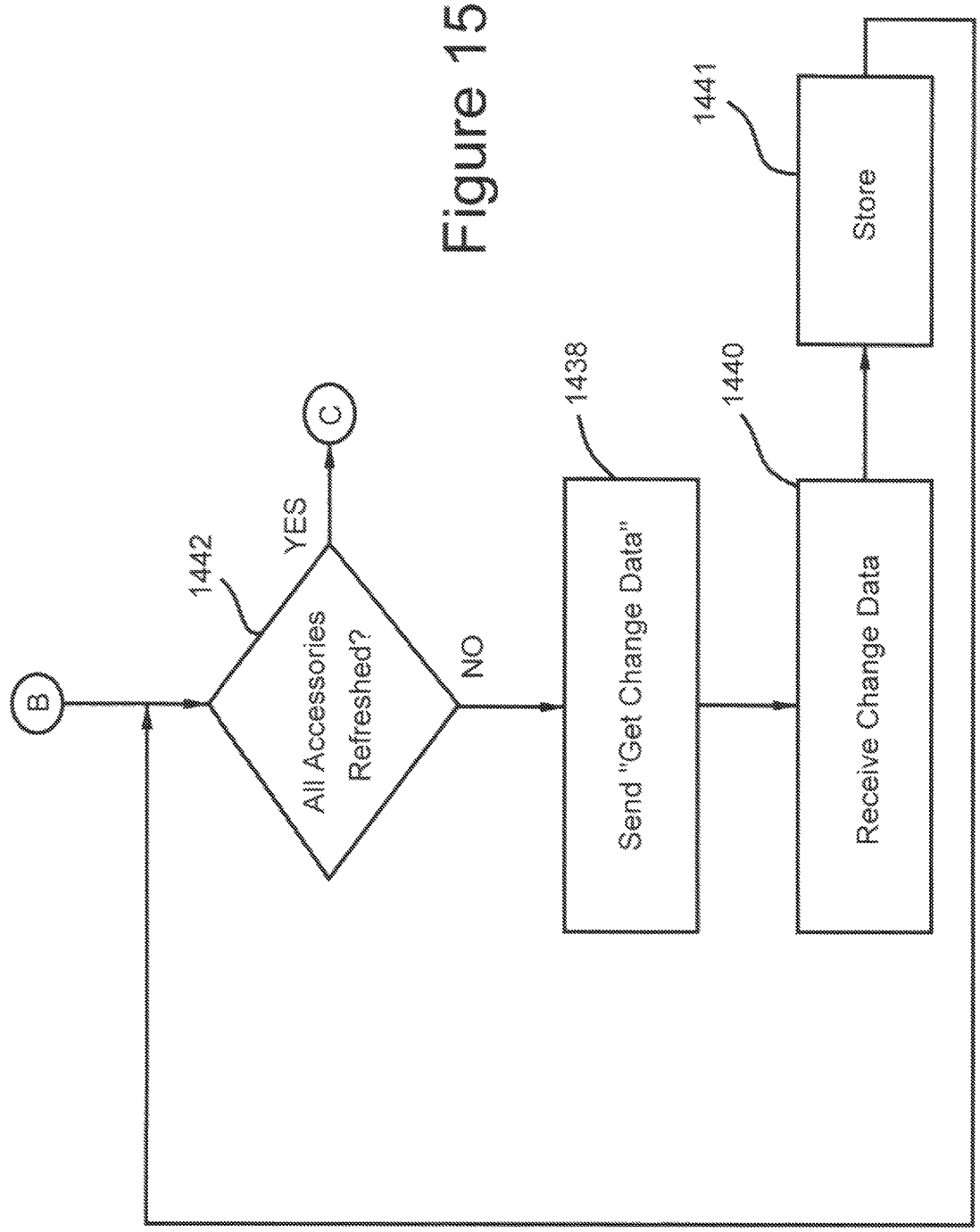
FIG. 15 is a block diagram of a portion of an exemplary method of controller operation illustrating the reception of change data in accordance with the present invention.
Figure 16:
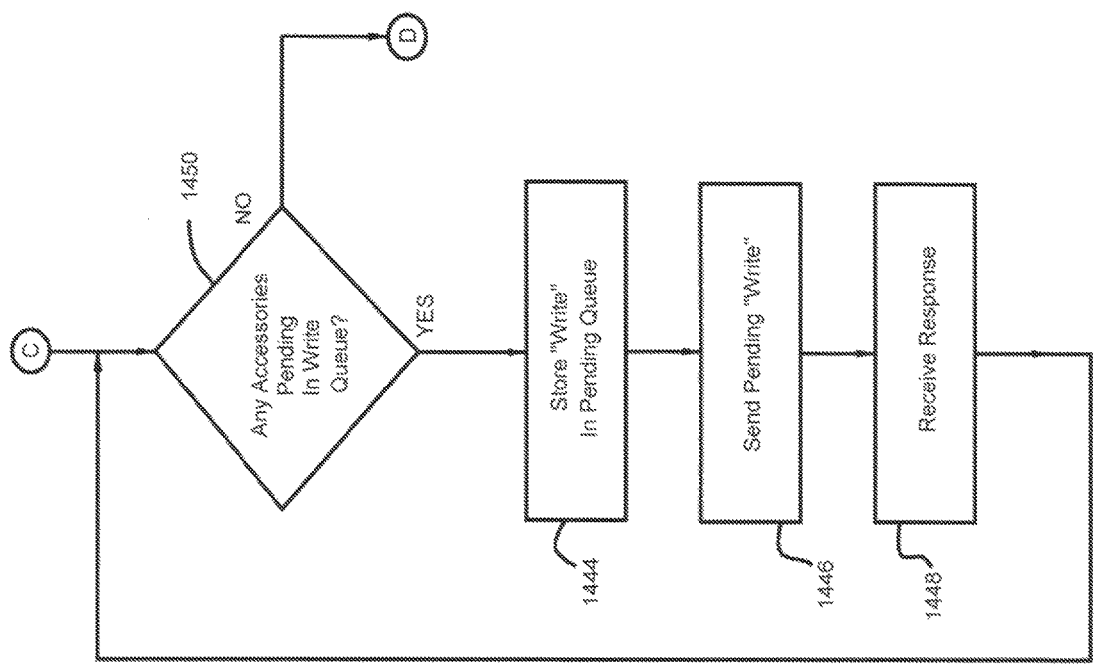
FIG. 16 is a block diagram of a portion of an exemplary method of controller operation illustrating the writing to memory of amendments of rules and the writing of command information to accessories in accordance with the present invention.

After the round illustrated in FIG. 15 has been completed, the system proceeds to the methodology illustrated in FIG. 16. At step 1450, the system proceeds to step 1444 if there are any accessories that are pending in the "Write" queue, where the system checks a database in which requests to "Write" information to devices are stored. These requests are put into the system by users, or, in principle, by an artificial intelligence algorithm monitoring the system, or by software in the controller which specifies the programming of accessories in response to certain conditions as the same may be read from accessories at step 1432 or step 1440. The system then proceeds to step 1446 to act on the next "Write" request. If there is a "Write" request in the queue, at step 1446 the system sends the "Write" command to the identified accessory. This may include adjusting sensitivity, adjusting a threshold value at which a signal is sent to the controller to signal the operation of a particular contactor, or the like. Thus, each of the accessories stores its own operating parameters. However, copies of the information for all accessories is also stored in the controller to provide redundancy. Moreover, the controller may, for certain devices, also store default values.

Figure 17:
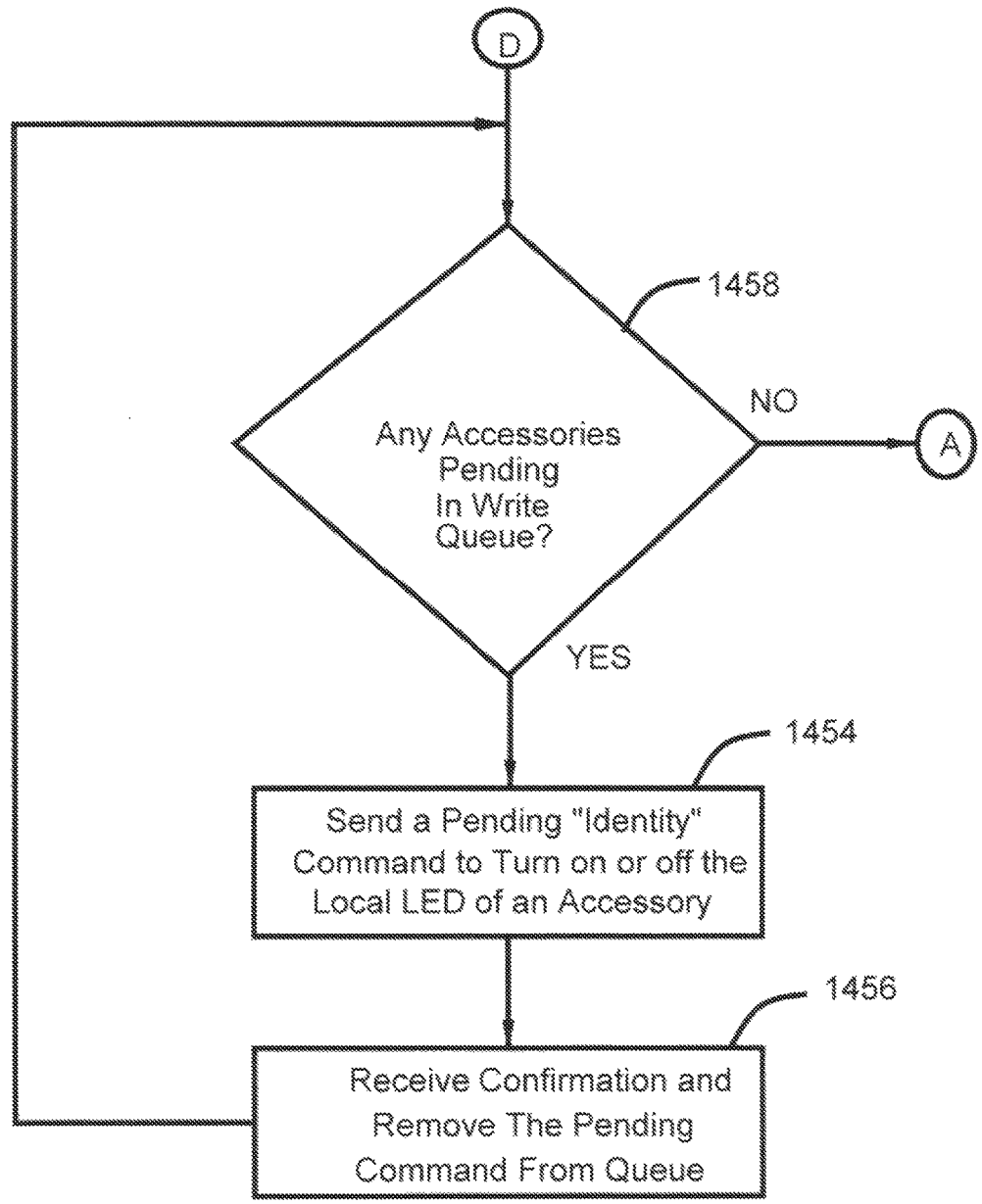
FIG. 17 is a block diagram of a portion of an exemplary method of controller operation illustrating a light activation methodology for the identification of accessories in accordance with the present invention.

After sending the "Write" command, as illustrated in FIG. 16, the system receives a response from the accessory at step 1448 indicating that the "Write" command was well received. The system then returns to step 1450, where the system proceeds to step 1446 to act on the next "Write" request, or, if there are no further requests in the queue, the system proceeds to step 1458 as illustrated in FIG. 17. The system then proceeds at step 1458 to either execute illumination of the service light on the first accessory if there are any accessories identified as pending in the "Identify" queue. If such a request is entered into the system either remotely or through an interface on the main panel, the system proceeds to step 1454. Generally, such requests are entered in order to physically identify a device by its assigned number. This number is assigned to the accessory during the installation of the accessory by either dipswitches or automatically assigned by the bus-master. Where there is such a request, the bus-master transmits an "Identify" command at step 1454 and receives a confirmation that the command has been received at step 1456. This allows personnel to check devices to identify the one which has had its service light illuminated. The system then proceeds again to step 1458 to either execute illumination of the service light on another accessory, by going through the loop again, if there are more accessories identified as pending in the "Identify" queue. If there are more accessories pending the system returns to step 1454. Otherwise, the systemproceeds to set the output state of the various contactors by applying the configuration rules (as is detailed more fully below) before returning to step 1414 where the process is repeated. In accordance with the invention, the process is repeated continuously during operation of the system which, typically, is 24 hours a day seven days a week.

More particularly, once the method of the present invention has enumerated all accessories in accordance with the methodology diagrammed in FIG. 13, and has updated all rule changes, reading changes and state changes of all accessories in accordance with the methodology diagrammed in FIGS. 14-17, as the controller proceeds to the method steps outlined in FIG. 18, in which the system applies the latest appliance readings and appliance states to the latest rules in order to determine the configuration of the main panel outputs.

More particularly, at step 1460, the system recalls the latest rules consisting of input conditions and associated output states. At step 1462, the actual input conditions, for example readings and states as most recently updated in accordance with the methods of FIGS. 14-17 are recalled, and these readings and states comprise an input data set. This input data set is then compared to the first rule at step 1464. Whether a match occurs between the input data set and a set of values which match the input data values of the first rule, the system determines that there is a match at step 1466. If the input data set includes such a set of values which match the input data values of the first rule, the first rule dictates the output configuration of the applicable contactors in the control panel. Such output configuration would then be stored at step 1468. The system would then check at step 1470 to see if a conflicting configuration were dictated by a prior rule applied at step 1464. Of course, during the application of the first rule, no such conflict would be possible. Thus there would be no conflict in the system would proceed to step 1472 where it is determined whether there is another rule to be applied. If it is not the last rule to be applied to system then returns to step 1464 and repeats the process.

However, on the second go around of the methodology of FIG. 18 as described above, it is possible that a conflict would be determined at step 1470 causing the system to proceed to step 1474, where the system looks at the priority of the prior conflicting rule and the current rule being applied and determines which one has priority. If the prior conflicting rule has priority, the configuration stored at step 1468 remains unchanged. If, on the other hand, the current rule has priority, the configuration called for by the current rule replaces the prior conflicting rule configuration and is stored in memory at step 1468. After such resolution of conflict, the system then proceeds to step 1472 where determines whether the final rule has been applied, proceeding to step 1464 to repeat the process if the final rule has not been applied. However, if the final rule has been applied, the system proceeds to step 1476, where the system looks at the latest configurations stored at step 1468 and then configures the contactor outputs of the control panel in accordance with such latest configurations. After applying the final rule at staff 1476, the system proceeds to step 1478 with the rules are updated in accordance with user inputs which may be entered by user from their personal computers, smart phones, and so forth. Following the update of the rules of step 1478 the system returns to step 1460 when the process is repeated.

Following such application of the latest rules, readings and states, by the configuration of the contactor outputs of the main control panel, the system then proceeds to step 1414 in FIG. 13, repeating the enumeration, updating and configuration operations of FIGS. 13-18.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention may be defined by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method for controlling a lighting system and/or various electrical loads comprising:
   receiving at least one configuration instruction;
   selecting at least one participant zone from a plurality of zones that designate predefined sections of at least one customer premise based upon the received configuration instruction and a plurality of stored output control configuration rules of the plurality of zones;
generating at least one output configuration based upon the selected at least one participant zone, the received at least one configuration instruction, and the plurality of stored output control configuration rules of the selected at least one participant zone;
   determining whether the at least one output configuration would violate the plurality of stored output control configuration rules;
   if the at least one output configuration would violate the plurality of stored output control configuration rules, modifying the at least one output configuration;
outputting the at least one output configuration; and
   controlling at least one of a lighting system and various electrical loads dependent on the outputted at least one output configuration.

2. The method of claim 1:
   Wherein whether the generated at least one output configuration violates the plurality of stored output control configuration rules is determined according to the selected at least one participant zone; and wherein the generated at least one output configuration is modified based upon the violation if the generated output configuration violates the plurality of stored output control configuration rules according to the selected at least one participant zone.

3. The method of claim 1, wherein prior to the receiving the at least one configuration instruction further comprising:
   storing a plurality of zones that designate predefined sections of at least one customer premise; and
   storing a plurality of output control configuration rules of the plurality of zones.

4. The method of claim 1, where the at least one participant zone designates at least one function of Alarm, Manual Override, Demand Response Load Control Dry Contact Light Harvesting, Program Schedule, and Zone Type Rule.

5. The method of claim 1, wherein generating the at least one output configuration further comprising:

receiving an alarm input signal from an external alarm system;
determining whether the Alarm Function is enabled; and
ignoring the alarm input signal if the Alarm Function is not enabled.

6. The method of claim 1, wherein generating the at least one output configuration further comprising:
receiving an alarm input signal from an external alarm system;
determining whether the Alarm Function is enabled; and
determining whether the Alarm Polarity is set to normally opened;
determining whether the alarm input signal carries a current;
setting the alarm input signal as inactive if the alarm input signal with current is not normally opened; and
setting the alarm input signal as active if the alarm input signal without current is normally opened.

7. The method of claim 6, wherein the setting the alarm input signal as inactive further comprising:
determining whether an alarm mode timer is set;
clearing the active status of the alarm input signal if no alarm mode timer was set.

8. The method of claim 6, wherein the setting the alarm input signal as active further comprising:
determining whether an alarm mode timer is set;
selecting the at least one participant zones for the alarm input signal if the alarm mode timer is not set;
determining whether the alarm is enabled for the at least one participant zones; and
setting the alarm input signal as active according to rules of the selected at least one participant zones if the alarm is enabled.

9. The method of claim 6, wherein the setting the alarm input signal as active further comprising:
determining whether an alarm mode timer is set;
setting the alarm duration with a count down time value if the alarm mode timer is set;
selecting the participant zones of the alarm input signal in clearing the active status of the alarm input signal upon the count down time value of the alarm duration; and
determining whether the alarm is enabled for the selected at least one participant zones; and
setting the alarm input signal as active according to rules of the at least one participant zones if the alarm is enabled.

10. The method of claim 1, wherein generating the at least one output configuration further comprising:
receiving a Manual Override Function;
selecting at least one participant zones of the Manual Override Function; and
executing the Manual Override Function for the selected at least one participant zones.

11. The method of claim 10, wherein the executing the Manual Override Function for the selected at least one participant zones further comprising:
determining whether a Manual Override Timer is set;
executing the Manual Override Function for the selected at least one participant zones until the Manual Override Function is inactive if the Manual Override Timer is not set; and
executing the Manual Override Function for the selected at least one participant zones based upon a Manual Override Duration if the Manual Override Timer is set.

12. The method of claim 1, wherein the generating the at least one output configuration further comprising:

receiving a Demand Response Load Control Function;
selecting the at least one participant zones of the Demand Response Load Control Function;
selecting a scheduled time of the Demand Response Load Control Function;
selecting a scheduled date of the Demand Response Load Control Function;
determining whether the scheduled date and time is valid;
generating a Demand Response Load Control configuration error if the scheduled date and time is not valid; and
executing the Demand Response Load Control Function for the selected at least one participant zones if the scheduled date and time is valid.

13. The method of claim 1, wherein the executing the Demand Response Load Control Function for the selected at least one participant zones further comprising:
determining whether a Demand Response Load Control Timer is set;
executing the Demand Response Load Control Function for the selected at least one participant zones until the Demand Response Load Control Function is inactive if the Demand Response Load Control Timer is not set; and
executing the Demand Response Load Control Function for the selected at least one participant zones based upon a Demand Response Load Control Duration if the Demand Response Load Control Timer is set.

14. The method of claim 1, wherein the generating the at least one output configuration further comprising:
selecting a first scheduled time period;
selecting a second scheduled time period that is different from the first scheduled time period;
receiving a Real Time Clock input;
determining whether the Real Time Clock input matches the first scheduled time period;
executing the first scheduled time period according to the configuration of the at least one participant zones if the Real Time Clock input matches the first scheduled time period;
determining whether the Real Time Clock input matches the second scheduled time period if the Real Time Clock input does not match the first scheduled time period; and
executing the second scheduled time period according to the configuration of the at least one participant zones if the Real Time Clock matches the second scheduled time period.

15. The method of claim 1, wherein the generating the at least one output configuration further comprising:
receiving a Real Time Clock input;
determining whether the Real Time Clock input matches a scheduled time period of a Light Harvesting Function;
selecting the at least one participant zones of the Light Harvesting Function;
obtaining a Light Level of the selected at least one participant zones;
obtaining a Light Harvesting Threshold of the selected at least one participant zones; and
executing a Light Harvesting Output for the selected at least one participant zones based upon the selected Light Level and the selected Light Harvesting Threshold.

16. The method of claim 15, wherein the generating a Light Harvesting Output for the selected at least one participant zones further comprising:

determining whether the Light Level is digital; and
turning off the at least one participant zones if the Light Level is digital.

17. The method claim 15, wherein generating a Light Harvesting Output for the selected at least one participant zones further comprising:
  determining whether the Light Harvesting Timer is set;
  executing the Light Harvest Function for the selected at least one participant zones until the Light Harvesting Function is inactive if the Light Harvesting Timer is not set; and
  executing the Light Harvesting Function for the selected at least one participant zones based upon a Light Harvesting Duration if the Light Harvesting Timer is set.

18. The method of claim 17, wherein the executing the Light Harvesting Function for the selected at least one participant zones based upon a Light Harvesting Duration further comprising:
  obtaining the Light Harvesting Duration of the at least one participant zones; and
    setting the Light Harvesting Duration with a count down time value;
    executing the Light Harvesting output of the at least one participant zones until the count down time value of Light Harvesting Duration.

19. A computer implemented system for controlling a lighting and various electrical load system comprising:
  means of receiving at least one configuration instruction;
  means of selecting at least one participant zone from a plurality of zones that designate predefined sections of at least one customer premise based upon the received configuration instruction and a plurality of stored output control configuration rules of the plurality of zones;
  means of generating at least one output configuration based upon the selected at least one participant zone, the received at least one configuration instruction, and the plurality of stored output control configuration rules of the selected at least one participant zone;
  means of determining whether the at least one output configuration would violate the plurality of stored output control configuration rules;
  means of modifying the at least one output configuration if the at least one output configuration would violate the plurality of stored output control configuration rules;
  means of outputting the generated at least one output configuration; and
  means for controlling at least one of a lighting system and various electrical loads dependent on the outputted at least one output configuration.

20. A apparatus for a lighting and load system controller comprising: a communication device that receives at least one configuration instruction; and
  a processor coupled to the communication device, wherein it selects at least one participant zone from a plurality of zones that designate predefined sections of at least one customer premise based upon the received configuration instruction and a plurality of stored output control configuration rules of the plurality of zones for generating and outputting at least one output configuration based upon the selected at least one participant zone, the received at least one configuration instruction, and the plurality of
  stored output control configuration rules of the selected at least one participant zone, and where the processor determines whether the at least one output configuration would violate the plurality of stored output control configuration rules, where if there is a violation the at least one output configuration is modified, and where at least one of a lighting system and various electrical loads are controlled depending on the outputted at least one output configuration.

* * * * *